United States Patent
Winker et al.

(10) Patent No.: US 10,401,497 B2
(45) Date of Patent: Sep. 3, 2019

(54) TRACKED BULLET CORRECTION

(71) Applicant: Teledyne Scientific & Imaging, LLC, Thousand Oaks, CA (US)

(72) Inventors: Bruce Kevin Winker, Ventura, CA (US); Brian Wesley Gregory, Newbury Park, CA (US); Milind Mahajan, Thousand Oaks, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 497 days.

(21) Appl. No.: 15/178,475

(22) Filed: Jun. 9, 2016

(65) Prior Publication Data
US 2017/0357002 A1    Dec. 14, 2017

(51) Int. Cl.
| | |
|---|---|
| *F41G 1/35* | (2006.01) |
| *F41G 1/46* | (2006.01) |
| *F41G 3/06* | (2006.01) |
| *F41G 3/08* | (2006.01) |
| *F41G 3/14* | (2006.01) |

(Continued)

(52) U.S. Cl.
CPC ............... *G01S 17/66* (2013.01); *F41G 1/35* (2013.01); *F41G 1/46* (2013.01); *F41G 1/473* (2013.01); *F41G 3/06* (2013.01); *F41G 3/08* (2013.01); *F41G 3/142* (2013.01); *F41G 3/165* (2013.01); *F41J 5/00* (2013.01); *F42B 12/387* (2013.01);

(Continued)

(58) Field of Classification Search
CPC . G01S 17/66; F41G 1/46; F41G 1/473; F41G 1/06; F41G 1/065; F41G 1/08; F41G 3/06; F41G 3/08; F41G 3/142; F41G 3/165
See application file for complete search history.

(56) References Cited

U.S. PATENT DOCUMENTS

| | | | |
|---|---|---|---|
| 4,015,258 A | 3/1977 | Smith et al. | |
| 5,336,899 A * | 8/1994 | Nettleton | F41G 3/06 250/333 |

(Continued)

FOREIGN PATENT DOCUMENTS

WO    2014186049 A9    1/2015

OTHER PUBLICATIONS

International Search Report for PCT Serial No. PCT/US2017/036569 dated Oct. 5, 2017.

(Continued)

*Primary Examiner* — Eric L Bolda
(74) *Attorney, Agent, or Firm* — K&L Gates LLP

(57) ABSTRACT

Systems, devices, and methods for determining a time of flight (TOF) of a first bullet fired from a gun to pass a target plane of a target; determining a location of an aimpoint on the target in an imager field of view (FOV) relative to a disturbed reticle at a time the first bullet is fired by the gun; determining a location of the first bullet relative to the location of the aimpoint on the target at the TOF in the imager FOV; and determining an updated location of the disturbed reticle based on a difference between the location of the first bullet and the location of the aimpoint on the target at the time the first bullet crosses the target plane and a difference between the location of the disturbed reticle and the location of the aimpoint on the target at the time the first bullet was fired.

19 Claims, 11 Drawing Sheets

(51) Int. Cl.
    *F41J 5/00*     (2006.01)
    *F41G 1/473*     (2006.01)
    *F42B 12/38*     (2006.01)
    *G01S 17/10*     (2006.01)
    *G01S 17/66*     (2006.01)
    *G01S 17/89*     (2006.01)
    *F41G 3/16*     (2006.01)
    *G01S 17/02*     (2006.01)

(52) U.S. Cl.
    CPC ............ *G01S 17/023* (2013.01); *G01S 17/10* (2013.01); *G01S 17/89* (2013.01)

(56) References Cited

U.S. PATENT DOCUMENTS 9,347,753 B1     5/2016     Horch et al.
2002/0129535 A1*   9/2002   Osborn, II ................ F41G 1/38
                                                                                                                  42/122
2009/0225299 A1*   9/2009   Crawford ................ G01C 3/08
                                                                                                                  356/4.07
2011/0315767 A1    12/2011   Lowrance
2012/0000979 A1*   1/2012   Horvath .................... F41G 1/38
                                                                                                                   235/407
2012/0097741 A1    4/2012   Karcher
2013/0016215 A1*   1/2013   Bitar ........................ F41G 1/38
                                                                                                                  348/143

OTHER PUBLICATIONS

Written Opinion of the International Prelirrninaly Examining Authority for International Application No. PCT/US2017/036569 dated Jul. 17, 2018.

International Preliminary Report on Patentability for International Application No. PCT/US2017/036569 dated Oct. 25, 2018.

* cited by examiner

TRACKED BULLET CORRECTION

TECHNICAL FIELD

Embodiments relate generally to systems, methods, and devices for bullet tracking, and more particularly to corrective bullet tracking.

BACKGROUND

U.S. military patrols are increasingly operating in remote areas, far from fire support. Patrols need to engage targets with lethal fire at longer standoff ranges. While sniper training may be adequate to address this need, snipers are not deployed with patrols on a regular basis. Squads currently include one or two squad designated marksmen (SDM) who have longer range rifles, but lack the extensive marksmanship training and experience of snipers.

SUMMARY

Exemplary method embodiments may include: determining, by a processor having addressable memory, a time of flight (TOF) of a first bullet fired from a gun to pass a target plane of a target, where the TOF may be based on at least one of: a distance from the gun to the target, a measured pressure, and a measured temperature; determining, by the processor, a location of an aimpoint on the target in an imager field of view (FOV) relative to a disturbed reticle at a time the first bullet is fired by the gun; determining, by the processor, a location of the first bullet relative to the location of the aimpoint on the target at the TOF in the imager FOV; and determining, by the processor, an updated location of the disturbed reticle based on a difference between the location of the first bullet and the location of the aimpoint on the target at the time the first bullet crosses the target plane and a difference between the location of the disturbed reticle and the location of the aimpoint on the target at the time the first bullet was fired.

Additional method embodiments may include: selecting, by the processor, the aimpoint on the target in the imager FOV; and tracking, by the processor, the location of the aimpoint on the target in the imager FOV. In additional method embodiments, determining the distance from the gun to the target may include: measuring the distance using a laser; decreasing a laser divergence; pulsing the laser; and receiving the pulsed laser reflected off the target at a laser rangefinder (LRF) receiver. Additional method embodiments may include: displaying the disturbed reticle via a display. Additional method embodiments may include: displaying the windage holdoffs via a display.

In additional method embodiments, determining the location of the first bullet at the TOF may further include: increasing a laser divergence; and shifting the laser to track the first bullet in a first bullet trajectory. In additional method embodiments, determining the location of the first bullet at the TOF may further include: decreasing the laser divergence; and tracking the first bullet at the TOF via laser light reflected by a retroreflector array disposed on an end of the first bullet and captured in the imager FOV. Additional method embodiments may include: determining, by the processor, when the first bullet is fired via a detected recoil of the gun by at least one of: a shock sensor, an accelerometer, a microphone, and an inertial measurement unit (IMU). Additional method embodiments may include: determining, by the processor, at least one of: an inclination of the gun at the time the first bullet is fired and a cant of the gun at the time the first bullet is fired.

Additional method embodiments may include: determining, by the processor, at least one of: a current inclination of the gun and a current cant of the gun; where the updated location of the disturbed reticle may be dynamically updated based on at least one of: a difference between the determined inclination of the gun at the time the first bullet was fired and the determined current inclination of the gun and a difference between the determined cant of the gun at the time the first bullet was fired and the determined current cant of the gun. Additional method embodiments may include: determining, by the processor, a location of the aimpoint on the target in the imager field of view (FOV) relative to the disturbed reticle at a time a second bullet is fired by the gun; and determining, by the processor, a location of the second bullet relative to the location of the aimpoint on the target at the TOF in the imager FOV.

In additional method embodiments, if the second bullet does not impact the target, may include: determining, by the processor, an updated location of the disturbed reticle based on a difference between the location of the second bullet and the location of the aimpoint on the target at the time the second bullet crosses the target plane and a difference between the location of the disturbed reticle and the location of the aimpoint on the target at the time the second bullet was fired. In additional method embodiments, if the second bullet impacts the target, may include: determining, by the processor, a second time of flight (TOF) of a third bullet fired from a gun to pass a second target plane of a second target, where the second TOF may be based on at least one of: a distance from the gun to the second target, a measured pressure, and a measured temperature; determining, by the processor, a location of an aimpoint on the second target in the imager FOV relative to the disturbed reticle at a time the third bullet is fired by the gun; determining, by the processor, a location of the third bullet relative to the location of the aimpoint on the second target at the second TOF in the imager FOV; determining, by the processor, an updated location of the disturbed reticle based on a difference between the location of the third bullet and the location of the aimpoint on the second target at the time the third bullet crosses the target plane and a difference between the location of the disturbed reticle and the location of the aimpoint on the second target at the time the third bullet was fired.

Exemplary system embodiments may include: a processor having addressable memory, the processor configured to: determine a time of flight (TOF) of a first bullet fired from a gun to pass a target plane of a target, where the TOF may be based on at least one of: a distance from the gun to the target, a measured pressure, and a measured temperature; determine a location of an aimpoint on the target in an imager field of view (FOV) relative to a disturbed reticle at a time the first bullet is fired by the gun; determine a location of the first bullet relative to the location of the aimpoint on the target at the TOF in the imager FOV; and determine an updated location of the disturbed reticle based on a difference between the location of the first bullet and the location of the aimpoint on the target at the time the first bullet crosses the target plane and a difference between the location of the disturbed reticle and the location of the aimpoint on the target at the time the first bullet was fired.

Additional system embodiments may include: a bullet tracking imager in communication with the processor, where the bullet tracking imager may include a narrowband laser filter. Additional system embodiments may include: a target tracking imager in communication with the processor, where the target tracking imager may include a broadband spectral response. Additional system embodiments may include: a laser in communication with the processor, where the processor may be further configured to: track the first bullet at the TOF via laser light reflected by a retroreflector array disposed on an end of the first bullet and captured in the bullet tracker imager FOV. Additional system embodiments may include: a motor driver in communication with the processor, where the processor may be further configured to: shift the laser to track the first bullet in a first bullet trajectory.

Additional system embodiments may include: a display in communication with the processor, where the processor may be further configured to: display the disturbed reticle and windage holdoffs prior to firing the first bullet; and display the updated disturbed reticle and windage holdoffs after firing the first bullet. Additional system embodiments may include: a sensor including at least one of: a shock sensor, an accelerometer, a microphone, and an inertial measurement unit (IMU) in communication with the processor, where the processor may be further configured to: determine when the first bullet is fired via a signal from the sensor.

Additional system embodiments may include: an inertial measurement unit (IMU) in communication with the processor, where the processor may be further configured to: determine when the first bullet is fired via a detected recoil; determine an inclination of the gun; and determine a cant of the gun; where the updated location of the disturbed reticle may be dynamically updated based on at least one of: a difference between the determined inclination of the gun at the time the gun was fired and the determined current inclination of the gun, and a difference between the determined cant of the gun at the time the gun was fired and the determined current cant of the gun. Additional system embodiments may include: a pressure sensor configured to transmit the measured pressure to the processor; a temperature sensor configured to transmit the measured temperature to the processor; and a laser rangefinder configured to transmit the distance from the gun to the target to the processor.

Exemplary device embodiments may include: a processor having addressable memory, the processor configured to: determine a time of flight (TOF) of a first bullet fired from a gun to pass a target plane of a target, wherein the TOF is based on at least one of: a distance from the gun to the target, a measured pressure, and a measured temperature; determine a location of an aimpoint on the target in an imager field of view (FOV) relative to a disturbed reticle at a time the first bullet is fired by the gun; determine a location of the first bullet relative to the location of the aimpoint on the target at the TOF in the imager FOV; and determine an updated location of the disturbed reticle based on a difference between the location of the first bullet and the location of the aimpoint on the target at the time the first bullet crosses the target plane and a difference between the location of the disturbed reticle and the location of the aimpoint on the target at the time the first bullet was fired. Additional device embodiments may include: an inertial measurement unit (IMU) in communication with the processor, where the processor may be further configured to: determine when the first bullet is fired via a detected recoil; determine an inclination of the gun; and determine a cant of the gun; where the updated location of the disturbed reticle may be dynamically updated based on at least one of: a difference between the determined inclination of the gun at the time the gun was fired and the determined current inclination of the gun, and a difference between the determined cant of the gun at the time the gun was fired and the determined current cant of the gun.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1A:
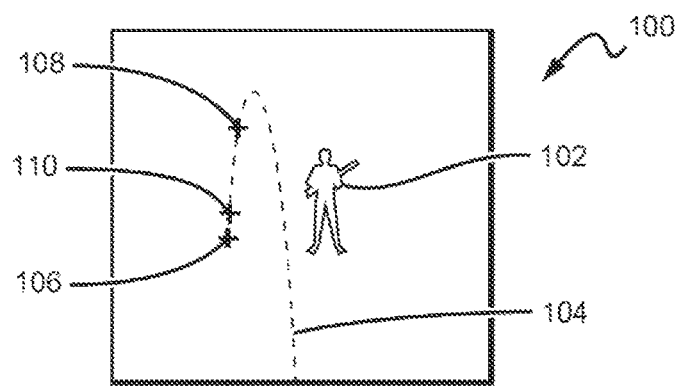
FIG. 1A depicts a trajectory of a bullet missing a target from a shooter's view.

The present system allows for accurate second shots to impact a target. The system determines a time of flight (TOF) of a first bullet fired from a gun to pass a target plane of the target. The TOF may be calculated from a knowledge of: a visually estimated or measured distance from the gun to the target, a measured pressure, a measured temperature, and a knowledge of the bullet ballistic coefficient and muzzle velocity. The system then determines a location of the target in an imager field of view (FOV) relative to a disturbed reticle at a time the first bullet is fired by the gun and a location of the first bullet relative to the location of the target at the TOF in the imager FOV. The system uses these locations, along with any changes in gun inclination and/or cant, to determine an updated location of the disturbed reticle based on a difference between the location of the first bullet and the location of the target at the time the first bullet crosses the target plane and a difference between the location of the disturbed reticle and the location of the target at the time the first bullet was fired. A second shot using this updated location will impact the target or continue updating the location of the disturbed reticle to account for aiming errors, crosswind, and/or relative motion between the gun and target. First, second, and third bullets and/or shots are used throughout to describe initial and/or subsequent shots, but may encompass a plurality of shots, additional shots, and/or additional bullets.

The location of the first bullet relative to the intended aimpoint on the target at the TOF is captured in the imager FOV by laser light reflected via a retroreflector array adhered to a base of the bullet. The retroreflector array has prism facets with a periodicity or pitch between 0.2 mm-2.0 mm. Preferably, the periodicity of the prism facets is between 0.3 mm-1.0 mm. A cover is disposed over the retroreflector array and sealed at the base of the bullet. The cover is disposed over the retroreflector array in a first position prior to firing, and the cover is released from the base of the bullet in a second position after firing. The cover prevents any gasses from scorching, or otherwise damaging, the retroreflector array due to exposure to high pressure propellant combustion gasses during firing.

Machine gunners on helicopters and boats must suppress or neutralize targets on the ground or surface of the water. Either the gun platform or the target may be moving at a high rate of speed, which requires the gunner to lead the target. The platform motion creates an additional crosswind component that deflects the bullet. Gunners require an unobstructed, wide field of view and typically use iron sights to aim the gun. Without a telescopic sight, the bullet impacts are difficult to see and the gunner has little feedback to indicate how to adjust fire. At typical target distances of 300-500 m under these conditions, these gunners typically have a probability of hitting the target of <0.05. Such a low probability of hit forces the gunner to fire many bullets during an engagement, causing barrel overheating and further degrading gun dispersion. Machine gunners need accurate feedback on missed shots so that they can correct fire early, thereby suppressing or neutralizing the target with far fewer bullets fired.

Bullets are typically fired from a gun that has a rifled barrel. The rifling causes the bullet to spin, providing gyroscopic stabilization to the bullet in flight and thereby preventing the bullet from tumbling. Bullets are secured in the mouth of a cartridge case that contains a primer and smokeless propellant. When the cartridge is loaded into the breech of the gun, and the gun is put into battery, the shooter fires the gun by pressing a trigger. The trigger releases a firing pin that impinges on the primer, causing it to ignite the propellant.

The controlled combustion of the pre-mixed oxidizer and fuel in the propellant causes the pressure to rise in the cartridge chamber. The increase in pressure forces the bullet to exit the cartridge case, engage with the barrel rifling and accelerate down the rifle barrel. Peak chamber pressures of >40,000 psi, flame temperatures of >2,000 K and setback accelerations of >50,000 Gs are typical in small caliber guns. When the bullet exits the barrel, the internal pressure is relieved and the bullet can experience a setforward acceleration of >10,000 Gs. Exposure of polymer materials to these conditions can scorch the surface of the polymer, and cause polymer adhesive joints to fail. Polymers used in bullet manufacture must be protected from damage due to propellant combustion and firing of the gun.

FIG. 1A depicts a trajectory of a bullet missing a target from a shooter's view 100. A target 102 may be located at a long range, e.g., greater than 300 meters (m), from a shooter. Accurate small arms fire at such a distance requires frequent weapon maintenance, extensive marksmanship training, as well as skill in wind estimation. If either the gun or the target is moving, then aiming errors can be a problem even at distances as short as 100 m. There is a need by both military and civilian, e.g., hunting, shooters to correct missed shots.

A bullet trajectory 104, shown in dashed lines, indicates that the bullet misses the target 102. The cause of a missed shot may be due to a human aiming error, a boresight error, i.e., between the aiming sight and the rifle barrel, ammo and gun dispersion, and/or several ballistic factors such as crosswind, rifle canting, spin drift, Coriolis error, and even downrange wind. These factors increase the miss distance with increasing range. In existing systems, poor visibility of a bullet trace and a bullet impact location 106 may prevent day and/or night tracking of the bullet trajectory 104. In many situations, the impact location 106 may not be visible. Even if the shooter could identify a location of a bullet at one or more locations (106, 108, 110) in the bullet trajectory 104, the shooter still does not know when the bullet crosses a target plane. As a result, the shooter cannot accurately correct the missed shot.

Figure 1B:
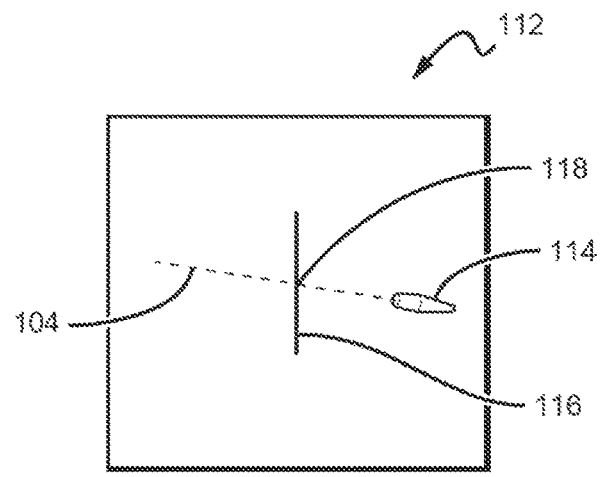
FIG. 1B depicts a side view of a bullet in the bullet trajectory in FIG. 1A passing a target plane.

FIG. 1B depicts a side view 112 of a bullet in the bullet trajectory in FIG. 1A passing a target plane. The bullet 114 is traveling in the bullet trajectory 104 as shown in FIG. 1A. The target (102, See FIG. 1A) is positioned in a target plane 116, i.e., a bullet passing through the target plane 116 at the location of the target would impact the target 102. The position of bullet 114 as it passes through the target plane 116 is a hit point 118.

Figure 1C:
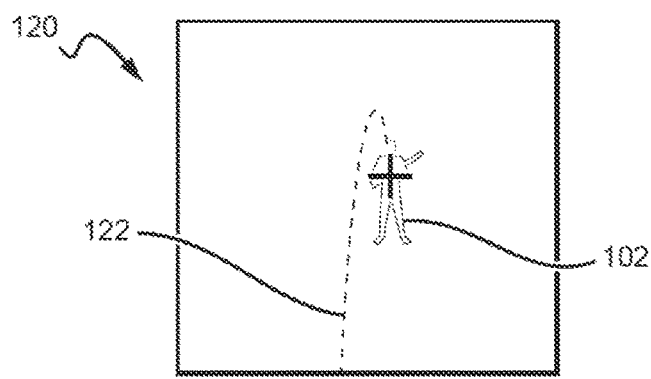
FIG. 1C depicts a trajectory of a bullet hitting the target in FIG. 1A from the shooter's view.

FIG. 1C depicts a trajectory of a bullet hitting the target in FIG. 1A from the shooter's view 120. A second bullet trajectory 122, shown in dashed lines, from a second shot indicates that the second bullet impacts the intended aimpoint on target 102. By identifying the location of the bullet in the first shot shown in FIG. 1A at the hit point (118, See FIG. 1B), the system and method disclosed herein may determine the location of a second shot to ensure impact with the aimpoint on target 102, as shown in FIG. 1C.

FIGS. 2A-2D depict a first exemplary configuration for tracked bullet correction using a digital crosshair.

Figure 2A:
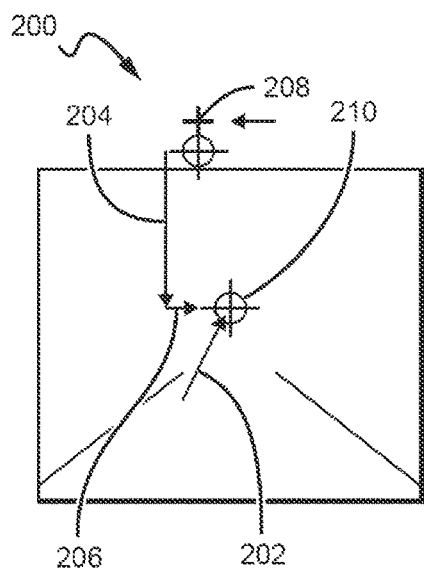
FIG. 2A depicts a laser boresight adjustment to account for elevation and windage from a tracking camera field of view (FOV)

FIG. 2A depicts a laser boresight adjustment to account for elevation and windage from a tracking camera field of view (FOV) 200. The tracking camera provides digital images of the target and of the laser reflected via the retroreflector on the bullet. The tracking camera may have two separate image sensors or two spatially separate image sensor regions (See FIGS. 10B-10C). One such sensor region may be optimally configured to track the target and the other to track the bullet. The targeting camera holds the target tracking camera and the bullet tracking camera in rigid alignment to each other. A shooter may manually adjust a laser boresight 202 to account for elevation adjustment V 204 and windage adjustment H 206 relative to a gun boresight 208. The shooter may calculate the elevation holdoff based on a knowledge of: a visually estimated or measured distance from the gun to the target, a measured pressure, a measured temperature, and a knowledge of the bullet ballistic coefficient and muzzle velocity. The shooter may calculate the windage holdoff based on these ballistic factors, plus a knowledge of the crosswind value and relative target motion. These ballistic calculations may be accomplished by the shooter referring to a look-up table of previously calculated values, or using a portable ballistic computer. A digital crosshair 210 (i.e., a disturbed reticle whose location in the field of view is controlled by a digital computer) is boresighted to the laser 202 either manually or electronically, e.g., via an encoder. In some embodiments, the digital crosshair 210 may be replaced by an analog reticle mechanism. A digital reticle is controlled by a digital computer and includes both analog and virtual crosshairs.

Figure 2B:
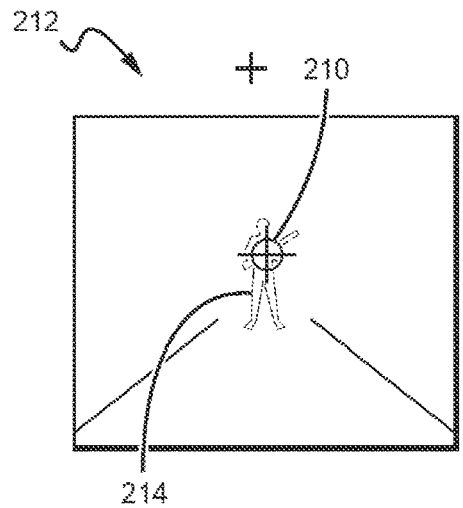
FIG. 2B depicts a position of a digital crosshair at the time of a gun firing from the tracking camera FOV.

FIG. 2B depicts a position of a digital crosshair at the time of a gun firing from the tracking camera FOV 212. The range from the shooter to a target 214 may be provided manually, e.g., via visual estimation by the shooter or an external rangefinder, and input into the system by the shooter. The shooter aims the gun to position the digital crosshair 210 on the intended aimpoint of the target 214. At the time the gun is fired, the system records the location of the digital crosshair 210 as the intended aimpoint on the target 214.

Figure 2C:
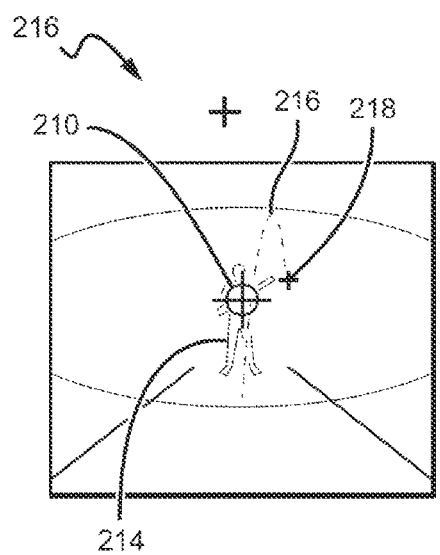
FIG. 2C depicts a trajectory of a bullet fired in FIG. 2B showing the location of the bullet at the time the bullet passes a target plane from the tracking camera FOV.

FIG. 2C depicts a trajectory of a bullet fired in FIG. 2B showing the location of the bullet at the time the bullet passes a target plane in the image from the tracking camera FOV 216. After firing the gun and subsequent recoil, the shooter repositions the gun so that the digital crosshair 210 is on the target 214 prior to the bullet passing the target plane. The bullet trajectory 216, shown in dashed lines, shows the position of the bullet at a hit point 218, i.e., the bullet location at the time the bullet passes the target plane. The location of the bullet at the hit point 218 may be determined by recording an image of the target and of the bullet at a time equal to the time of flight (TOF) of the bullet as calculated by the system. The TOF may be calculated from a knowledge of: a visually estimated or measured distance from the gun to the target, a measured pressure, a measured temperature and a knowledge of the bullet ballistic coefficient and muzzle velocity. The location of the bullet at the hit point 218 may be determined by locating the aimpoint in the target image and the bullet in the bullet image at the TOF of the bullet. The aimpoint correction is the relative distance of the bullet image from the aimpoint.

Figure 2D:
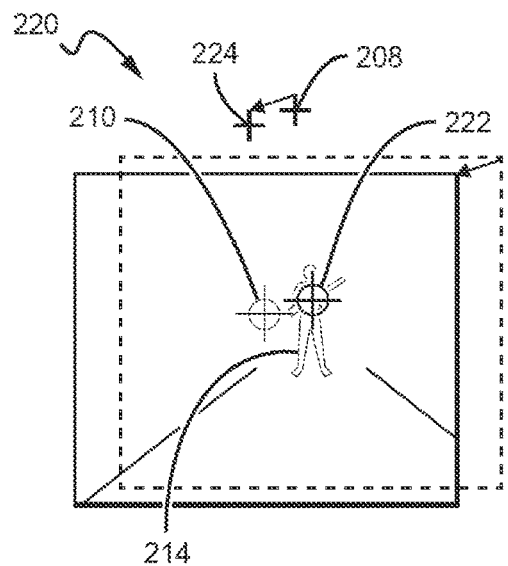
FIG. 2D depicts a position of a corrected digital crosshair based on an exemplary system error calculation from the tracking camera FOV.

FIG. 2D depicts a position of a corrected digital crosshair based on an exemplary system error calculation from the tracking camera FOV 220. A corrected digital crosshair 222 is displayed to the shooter, and the previous digital crosshair 210 is removed. Accordingly, the shooter aims the gun to move the gun boresight from an initial position 208 to a revised position 224 such that the corrected digital crosshair is positioned on the target 214. The shooter may then fire a second bullet to impact the target 214. The second bullet may be fired shortly after the initial bullet, e.g., within ten seconds, to minimize any changes in wind and/or relative target velocity. Preferably, the second shot is fired within five seconds after the first shot. Under typical wind conditions at long range, the effect of wind acceleration between shots on the hit point is negligibly small if the second shot is fired within five seconds after the first shot. If the second bullet also fails to impact the target 214, e.g., due to changing wind, the process repeats with a subsequent corrected digital crosshair.

FIGS. 3A-3D depict a second exemplary configuration for tracked bullet correction using a digital crosshair and a digital reticle.

Figure 3A:
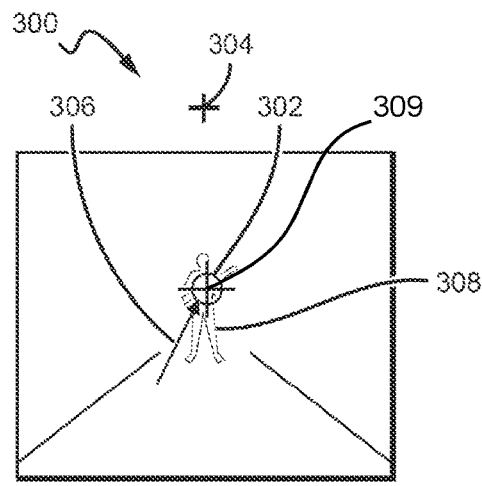
FIG. 3A depicts a location of a digital crosshair relative to a rifle boresight to account for elevation from a tracking camera field of view (FOV)

FIG. 3A depicts a location of a digital crosshair relative to a rifle boresight to account for elevation adjustment in a tracking camera field of view (FOV) 300. In some embodiments, the digital crosshair 302 may be replaced by an analog reticle mechanism. A disturbed reticle includes both analog and virtual crosshairs. A digital crosshair 302 is located below a gun boresight 304 to account for elevation adjustment and windage adjustment. The elevation and windage holdoffs may be calculated based on a knowledge of: a visually estimated or measured distance from the gun to the target, a measured pressure, a measured temperature, a knowledge of the crosswind value and relative target motion, and a knowledge of the bullet ballistic coefficient and muzzle velocity. These ballistic calculations may be accomplished by the shooter referring to a look-up table of previously calculated values, or using a portable ballistic computer. A laser 306 may be boresighted to the digital crosshair 302. The shooter positions the digital crosshair 302 over an intended aimpoint 309 on a target 308 and selects the aimpoint 309, e.g., via pressing a button. The system records contrast features on the target 308 surrounding the aimpoint 309 and may then continuously track the aimpoint 309. The range from the shooter to the target 308 may be provided manually, e.g., via an external rangefinder, or determined by the system at the time the aimpoint 309 is selected by the shooter.

Figure 3B:
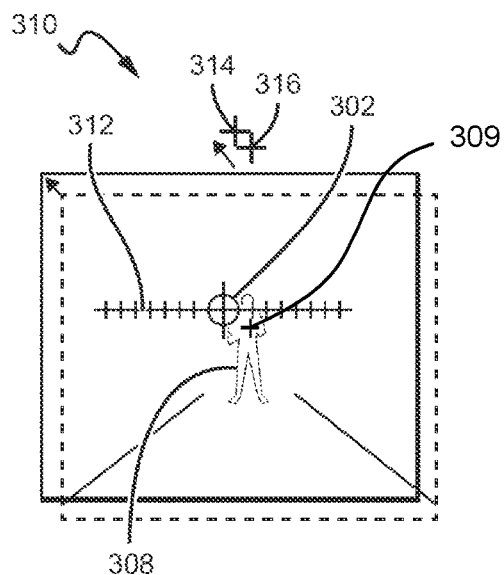
FIG. 3B depicts a position of a digital crosshair and a digital reticle relative to a target at the time of a gun firing from the tracking camera FOV.

FIG. 3B depicts a position of a digital crosshair and a digital reticle relative to a target at the time of a gun firing in the tracking camera FOV 310. After selecting the target in FIG. 3A, the system may present a digital reticle 312 including the digital crosshair 302 and windage holdoff marks. Based on the shooter's perception of crosswind and relative target motion, the shooter can select a windage holdoff to attempt to impact the aimpoint 309 on the first shot. At the time of gun fire, the shooter's aim may include an intentional windage holdoff and/or any unintentional aiming error. For example, the intentional windage holdoff may place the digital crosshair 302 to the left of the target, as shown. An aiming error may place the gun boresight at a position 314 up and to the left of a position 316 over the aimpoint 309.

Figure 3C:
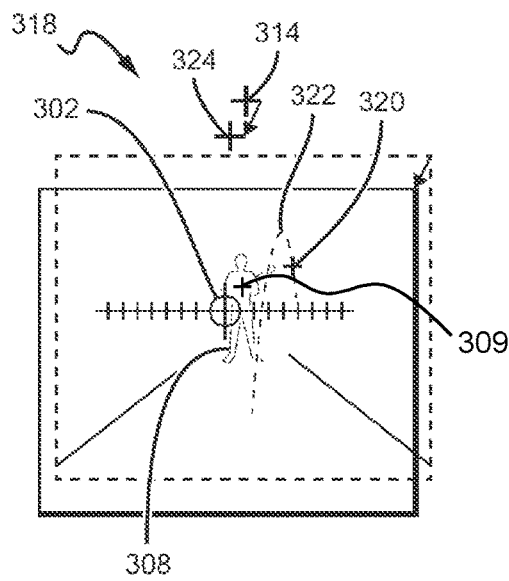
FIG. 3C depicts a trajectory of a bullet fired in FIG. 3B showing the location of the bullet at the time the bullet passes a target plane from the tracking camera FOV.

FIG. 3C depicts a trajectory of a bullet fired in FIG. 3B showing the location of the bullet at the time the bullet passes a target plane, as recorded by the tracking camera FOV 318. After firing the gun and subsequent recoil, the shooter may reposition the gun so that the tracking camera field of view includes the aimpoint 309 and a position of the bullet at a hit point 320, i.e., at the time the bullet passes a target plane. For example, the gun boresight may move from the position 314 at firing to a new position 324 due to gun recoil. The digital crosshair 302 does not have to be located directly on the target as in the exemplary configuration depicted in FIGS. 2A-2D, because the target is being tracked by the system. The bullet trajectory 322, shown in dashed lines, shows the position of the bullet at the hit point 320. The location of the bullet at the hit point 320 may be determined based on a time of flight (TOF) of the bullet as calculated by the system. The TOF may be calculated from a knowledge of: a visually estimated or measured distance from the gun to the target, a measured pressure, a measured temperature and a knowledge of the bullet ballistic coefficient and muzzle velocity. The location of the bullet at the hit point 320 may be determined by locating the aimpoint 309 in the target image and the bullet in the target image at the TOF of the bullet.

Figure 3D:
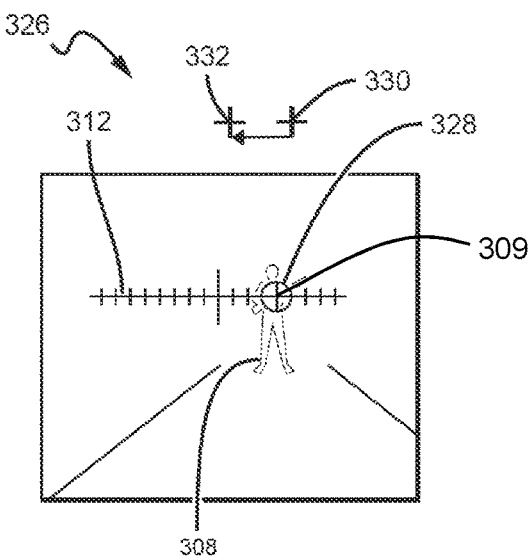
FIG. 3D depicts a position of a corrected digital crosshair and digital reticle based on an exemplary system error calculation from the tracking camera FOV.

FIG. 3D depicts a position of a corrected digital crosshair and digital reticle based on an exemplary system aiming error calculation from images recorded in the tracking camera FOV 326. The system determines this aiming error correction by comparing three images: i) the image of the aimpoint 309; ii) the image of the target 308 at TOF; and iii) the image of the bullet at TOF. The aiming correction includes the effects of aiming errors when the gun was fired, errors in the shooter's estimate of wind, boresight errors between the gun barrel and the tracking camera, and unknown ballistic factors such as rifle cant, spin drift, Coriolis, etc. A corrected digital crosshair 328 is displayed to the shooter at a position on the digital reticle 312 to account for windage holdoff. Accordingly, the shooter aims the gun to move the gun boresight from a present position 330 to a revised position 332 such that the corrected digital crosshair 328 is positioned on the aimpoint 309. The shooter may then fire a second bullet to impact the aimpoint 309. The second bullet may be fired shortly after the initial bullet, e.g., within ten seconds, to minimize any changes in wind and/or target velocity. Preferably, the second shot is fired within five seconds after the first shot. If the second bullet also fails to impact the target, e.g., due to changing wind, changing relative motion between the gun and target, changing rifle cant, etc., between the first and second shots, the process repeats with a subsequent corrected digital crosshair.

Figure 4:
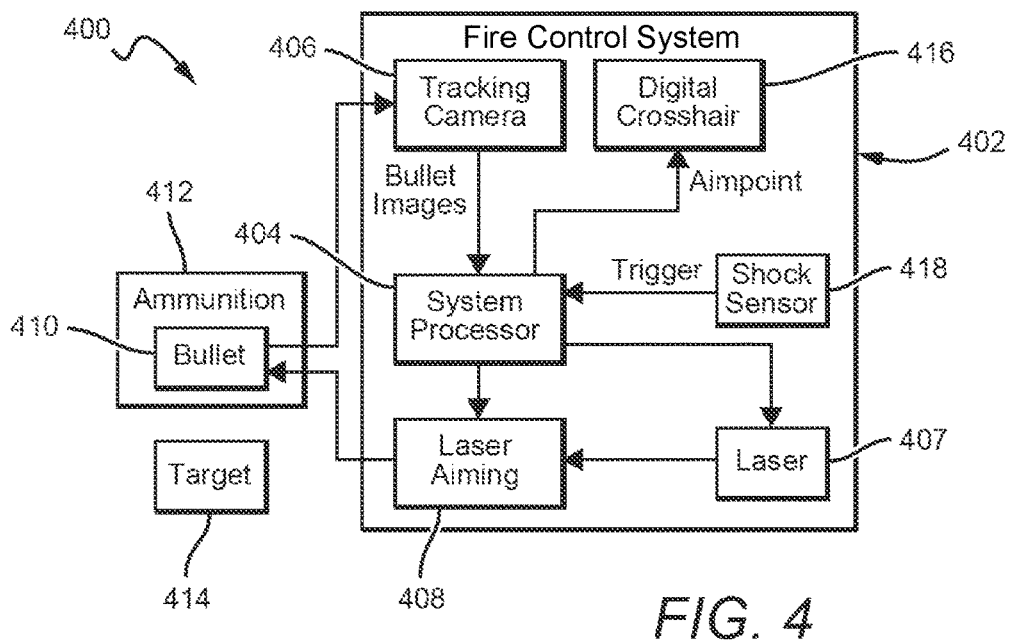
FIG. 4 depicts an exemplary system architecture of a first exemplary system.

FIG. 4 depicts an exemplary system architecture 400 of a first exemplary system. The first exemplary system may correspond to the first exemplary configuration for tracked bullet correction using the digital crosshair shown in FIGS. 2A-2D. This first exemplary embodiment utilizes a single imager for bullet tracking and has distance, pressure, and temperature measurements manually input by a shooter.

The primary components of the system may be embodied in a fire control system 402, a portion of which may be detachably attached or fixedly attached to a gun. In some embodiments, the fire control system 402 may be detached from a gun, but in communication with a digital reticle 416 attached to the gun. The system includes a processor having addressable memory 404. An imager, such as a bullet tracking imager 406, may be in communication with the processor 404. A laser 407 may be in communication with the processor 404. A laser aiming device 408 may be in communication with the processor 404 and used to position the laser 407 to track a bullet trajectory of a bullet 410. Ammunition 412 used by the system may include one or more bullets 410 having a retroreflector array disposed on a base. Laser light from the laser 407 is reflected by the retroreflector array disposed on the base of the bullet 410 and captured in a field of view (FOV) of the tracking imager 406.

In this first exemplary system 400, a distance from the gun to a target 414 may be visually estimated or measured by a shooter using an external system or device, e.g., a laser rangefinder. This distance from the gun to the target 414 may be manually entered into the fire control system 402 by the shooter. In some embodiments, the shooter may enter in a visual estimate of range as the distance from the gun to the target 414. The visual estimate of range may be based on pre-set distances, e.g., a short distance of 50-300 m, a medium distance of 250-400 m, and a long distance of 400-500 m. The shooter may also measure the local pressure and/or temperature using an external system or device and manually enter these measurements into the fire control system 402. The shooter may calculate the required elevation and windage adjustments and manually or electronically enter these values into the fire control system 402. The shooter may calculate the elevation holdoff based on a knowledge of: a visually estimated or measured distance from the gun to the target, a measured pressure, a measured temperature, and a knowledge of the bullet ballistic coefficient and muzzle velocity. The shooter may calculate the windage holdoff based on these ballistic factors, plus a knowledge of the crosswind value and relative target motion. The shooter may then determine a time of flight (TOF) of the bullet 410 fired from the gun to pass a target plane (See FIG. 1B) of the target 414 based on the distance from the gun to the target 414, and manually or electronically enter this value into the fire control system 402. These ballistic calculations may be accomplished by the shooter referring to a look-up table of previously calculated values, or using a portable ballistic computer. This calculated TOF may correspond to a number of frames captured by the bullet tracking imager 406.

The system computer 404 positions the digital crosshair 416 to account for elevation and windage adjustments. A shooter aims the gun to align the digital crosshair 416 with the intended aimpoint on the target 414. The digital crosshair 416 may be shown on a display, e.g., a scope, presented to the shooter. In some embodiments, the digital crosshair 416 may be replaced by an analog reticle mechanism. A disturbed reticle includes both analog and virtual crosshairs. At the time the bullet 410 is fired a shock sensor 418, in communication with the processor 404, detects the recoil of the gun. In some embodiments, a microphone in communication with the processor 404 may be used to determine the time when the bullet 410 is fired. The processor 404 determines the TOF for the bullet to pass the target plane from the moment the recoil is sensed by the shock sensor 418. The laser 407 illuminates a retroreflector array disposed on a base of the bullet 410 during the bullet trajectory towards the target 414. At the TOF when the bullet 410 passes the target plane, the bullet tracking imager 406 captures the light reflected by the retroreflector array of the bullet 410. Following recoil of the gun during firing, the shooter positions the digital crosshair 416 on the aimpoint on the target 414 at the TOF. The shooter may have to position the digital crosshair 416 on the intended aimpoint of the target 414 before the TOF and maintain the location of the digital crosshair 416 on the aimpoint until the TOF. The processor 404 can then determine the location of the bullet 410 relative to the location of the target, which is the location of the digital crosshair. The processor 404 can then provide an updated location of the digital crosshair 416 based on a difference between the location of the bullet 410 and the location of the digital crosshair 416 at the time the bullet 410 crosses the target plane at the TOF, i.e., the hit point (See FIG. 1B). The shooter can align this updated digital crosshair 416 with the intended aimpoint on the target 414 and fire a second bullet 410 which will then impact the target or provide an updated location of the digital crosshair 416 due to any wind changes and/or shooter errors. The time between the first shot and a second shot may be short, e.g., within ten seconds, to prevent errors caused by wind changes or acceleration in the relative target motion. Preferably, the second shot is fired within five seconds after the first shot.

Figure 5:
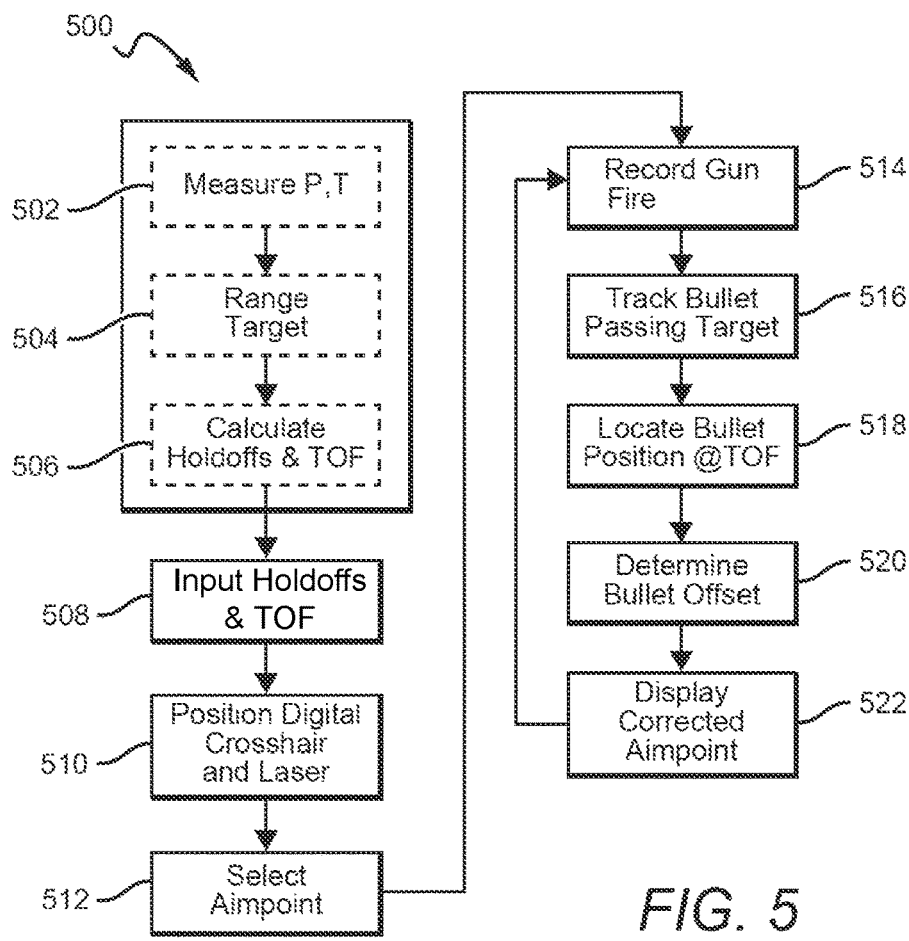
FIG. 5 depicts an exemplary functional block diagram of the first exemplary system depicted in FIG. 4.

FIG. 5 depicts an exemplary functional block diagram 500 of the first exemplary system depicted in FIG. 4. The shooter may measure the local pressure and temperature using an external pressure sensor and temperature sensor, respectively (step 502). The shooter may also visually estimate or measure a distance from the gun to the target (step 504), e.g., by using a laser rangefinder. The shooter may calculate the required elevation and windage adjustments (step 506). The shooter may calculate the elevation holdoff based on a knowledge of: a visually estimated or measured distance from the gun to the target, a measured pressure, a measured temperature, and a knowledge of the bullet ballistic coefficient and muzzle velocity. The shooter may calculate the windage holdoff based on these ballistic factors, plus a knowledge of the crosswind value and relative target motion. These ballistic calculations may be accomplished by the shooter referring to a look-up table of previously calculated values, or using a portable ballistic computer. The shooter may calculate a time of flight (TOF) of a bullet fired from the gun to hit the target based on the distance to the target, measured pressure, and measured temperature (step 506). The shooter may also measure the crosswind and calculate or estimate a holdoff for wind. These steps (steps 502, 504, 506) may all be accomplished via external equipment, an external processor, and/or a look-up table.

The elevation and windage holdoffs, and TOF may be manually or electronically entered into the system (step 508), e.g., a processor of a fire control system, a portion of which may be fixedly or detachably attached to a gun (See FIG. 4). The processor (404, See FIG. 4) may then adjust the digital crosshair and laser to account for elevation and windage adjustments (step 510). The shooter then selects an aimpoint, which coincides with the position of the digital crosshair, and fires the gun (step 512). The time of the gun fire is recorded (step 514), e.g., by a shock sensor (418, See FIG. 4), microphone, and/or inertial measurement unit (IMU). The shooter then positions the gun to get the digital crosshair back on the target before the bullet passes the target plane. The bullet tracking imager (406, See FIG. 4) tracks the bullet passing the target plane (step 516). The processor (404, See FIG. 4) locates the bullet position at the TOF, i.e., at the hit point at the time the bullet is passing the target plane (step 518). The processor (404, See FIG. 4) then determines the bullet offset between the bullet location and the target location, i.e., the location of the digital crosshair at the same time as the bullet location is recorded (step 520). The digital crosshair is given an updated location based on the bullet offset (step 522). The shooter may then fire a second shot and the process repeats with recording the gun fire (step 514). If the second shot does not impact the target, then this loop continues until the target is hit. If the second shot does impact the target, then the process repeats with manual inputs (steps 502, 504, 506) for a second, and subsequent, target.

Figure 6:
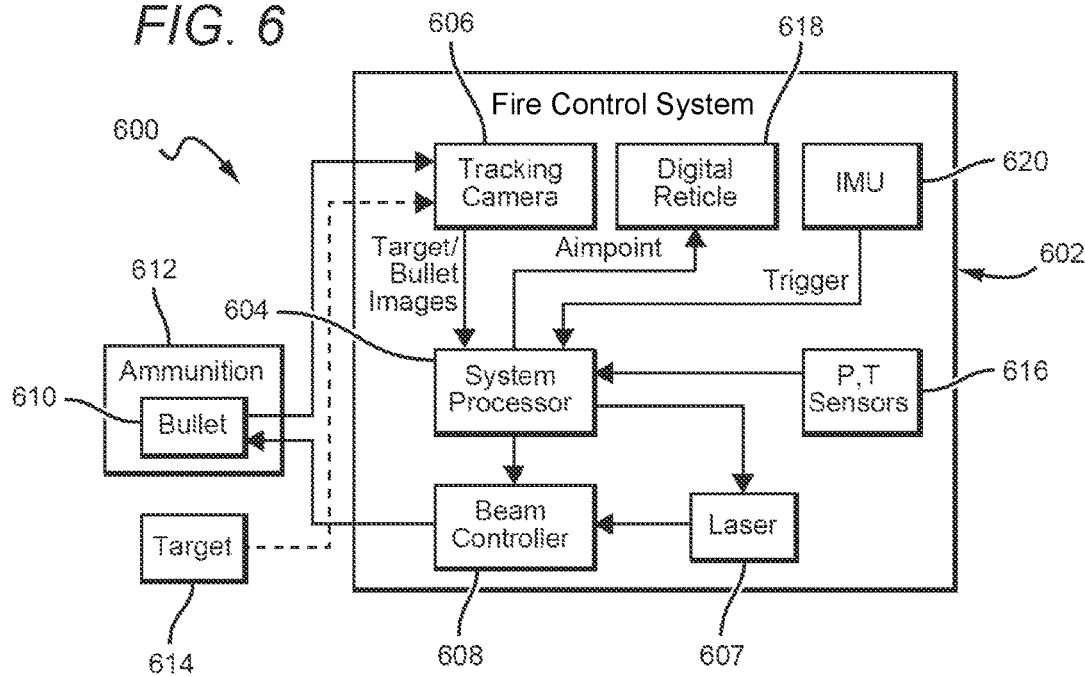
FIG. 6 depicts an exemplary system architecture of a second exemplary system having integrated target tracking.

FIG. 6 depicts an exemplary system architecture 600 of a second exemplary system having integrated target tracking and laser beam steering. The second exemplary system may correspond to the second exemplary configuration for tracked bullet correction using the digital crosshair and the digital reticle as shown in FIGS. 3A-3D. This second exemplary embodiment utilizes imagers for bullet tracking and target tracking, sensors for pressure and temperature measurements, and a beam controller to steer the laser beam. Target distance is either manually or electronically entered into the system processor.

The primary components of the system may be embodied in a fire control system 602, a portion of which is detachably attached or fixedly attached to a gun. In some embodiments, the fire control system 602 may be detached from a gun, but in communication with a reticle 618 attached to the gun. The system includes a processor having addressable memory 604. One or more imagers, such as a bullet tracking imager and a target tracking imager, may be in communication with the processor 604. A laser 607 may be in communication with the processor 604. A beam controller 608 may be in communication with the processor 604 and used to position the laser 607 to track a bullet trajectory of the bullet 610. Ammunition 612 used by the system may include one or more bullets 610 having a retroreflector array disposed on a base of the bullet 610. Laser light from the laser 607 is reflected by the retroreflector array disposed on the base of the bullet 610 and captured in a field of view (FOV) of the imager 606, e.g., a bullet tracking camera having a narrowband laser filter.

In this second exemplary system 600, a distance from the gun to a target 614 may be visually estimated or measured by a shooter using an external system or device, e.g., a laser rangefinder. In some embodiments, the shooter may enter in a visual estimate of range as the distance from the gun to the target 414. The visual estimate of range may be based on pre-set distance criteria, e.g., a short distance of 50-300 m, a medium distance of 250-400 m, and a long distance of 400-500 m. This distance from the gun to the target 614 may be manually or electronically entered into the fire control system 602 by the shooter. The local pressure and/or temperature may be measured by pressure and temperature sensors 616 in communication with the processor 604. The system processor 604 may then determine a time of flight (TOF) of the bullet 610 fired from the gun to pass a target plane (See FIG. 1B) of the target 614 based on the distance from the gun to the target, the measured pressure, and/or the measured temperature. This calculated TOF may correspond to a number of frames captured by the imager 606, e.g., the bullet tracking camera having a narrowband laser filter and a set frame rate. The system processor 604 may calculate the elevation holdoff based on a knowledge of: a visually estimated or measured distance from the gun to the target, a measured pressure, a measured temperature, and a knowledge of the bullet ballistic coefficient and muzzle velocity. The system processor 604 may calculate the windage holdoff based on these ballistic factors, plus a knowledge of the crosswind value and relative target motion.

The shooter uses a digital reticle 618, e.g., a digital crosshair with windage holdoff marks, in communication with the processor 604 to align the digital crosshair with the intended aimpoint on target 614. The digital reticle 618 may be shown on a display, e.g., a scope, presented to the shooter. In some embodiments, the digital reticle 618 may be replaced by an analog reticle mechanism. A disturbed reticle includes both analog and virtual crosshairs. At the time the bullet 610 is fired the IMU 620, in communication with the processor 604, detects the recoil of the gun. In some embodiments, a microphone in communication with the processor 604 may be used to determine the time when the bullet 610 is fired. The processor 604 determines the TOF for the bullet to pass the target plane from the moment the recoil is measured by the IMU 620. The laser 607 illuminates the retroreflector array disposed on a base of the bullet 610 during the bullet trajectory towards the target 614. At the TOF when the bullet 610 passes the target plane, the imager 606, e.g., the bullet tracking camera, captures the light reflected by the retroreflector array of the bullet 610. The shooter does not need to position the digital crosshair on the target 614 at the TOF following recoil of the gun during firing as long as the target 614 is within the field of view (FOV) of the imager 606, e.g., a target tracking camera having a broadband spectral response. The shooter may select the aimpoint on target 614 prior to firing and the processor 604 may track the location of the aimpoint on target 614 thereafter. The processor 604 can then determine the location of the bullet 610 relative to the tracked location of the aimpoint on target 614 at the time the bullet 610 passes the target plane at the calculated TOF. The processor 604 can then provide an updated location of the digital reticle 618 based on a difference between the location of the bullet 610 and the location of the aimpoint on target 614 at the time the bullet 610 crosses the target plane at the TOF. The shooter can align this updated digital reticle 618 with the intended aimpoint on target 614. The shooter can fire a second bullet 610 which will then impact the target or provide an updated location of the digital reticle 618 due to any wind changes, shooter errors, changes in rifle cant and/or relative target motion. The time between the first shot and a second shot may be short, e.g., within ten seconds, to prevent errors caused by wind changes or acceleration in the relative target motion. Preferably, the second shot is fired within five seconds after the first shot.

Figure 7:
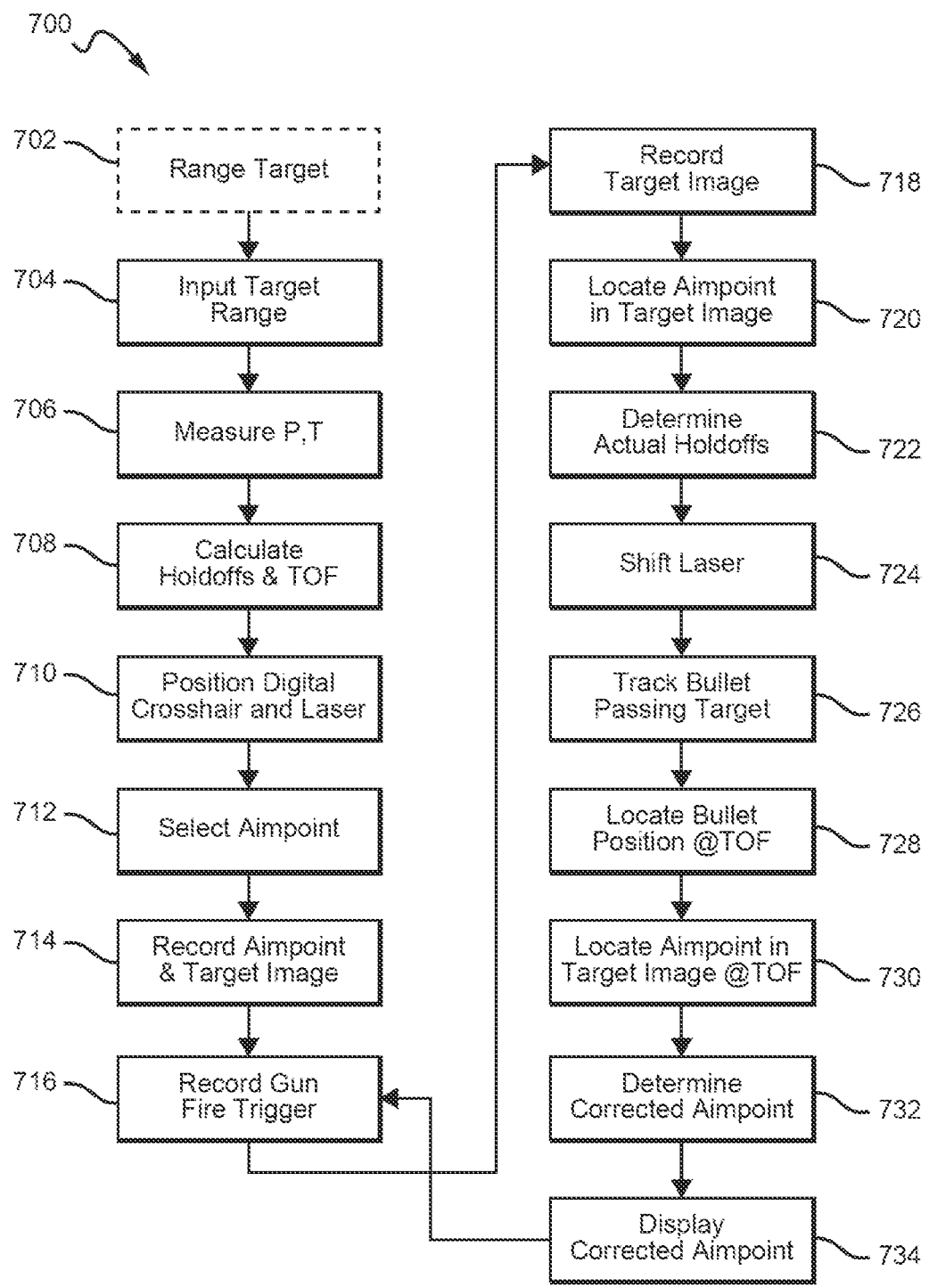
FIG. 7 depicts an exemplary functional block diagram of the second exemplary system depicted in FIG. 6.

FIG. 7 depicts an exemplary functional block diagram 700 of the second exemplary system depicted in FIG. 6. The shooter may measure a distance from the gun to the target using separate equipment (step 702), e.g., a laser rangefinder. The shooter may manually or electronically input this measured range to the target into the system (step 704), e.g., a processor of a fire control system, a portion of which may be fixedly or detachably attached to a gun (See FIG. 6). Pressure and temperature sensors in communication with the processor may measure the local pressure and temperature (step 706). The system processor may calculate the elevation holdoff based on a knowledge of: a visually estimated or measured distance from the gun to the target, a measured pressure, a measured temperature, and a knowledge of the bullet ballistic coefficient and muzzle velocity. The system processor may calculate the windage holdoff based on these ballistic factors, plus a knowledge of the crosswind value and relative target motion. The system processor may calculate a time of flight (TOF) of a bullet fired from the gun to hit the target based on the distance to the target, measured pressure, and measured temperature (step 708). The shooter may then position the digital crosshair and laser as needed based on the target (step 710). The shooter may then select an aimpoint on a target (step 712). The aimpoint may be selected by a system input, e.g., the shooter pressing a button. The aimpoint may be recorded as a location on the target image (step 714). A target tracking imager may register contrast features used to track the location of the aimpoint on the target within the field of view (FOV) of the target tracking imager. If the location of the aimpoint, digital crosshair, move, then the change in aimpoint position will be tracked by the target tracking imager in communication with the processor.

The system records that the gun has been fired (step 716). The time of the gun fire is recorded by an inertial measurement unit (IMU) (620, See FIG. 6). The target image is recorded at the time of gun fire (step 718). The aimpoint, e.g., the location of the digital crosshair, is located in the recorded target image (step 720). The system may register contrast features relating to the target position. The system determines actual holdoffs (step 722). These holdoffs relate to aiming error and the shooter's windage holdoff, e.g., if the shooter places the digital crosshair offset from the target to account for wind or relative target motion (See FIG. 3C). The laser may be shifted to track the bullet trajectory towards the target (step 724). Shifting the laser may be optional depending on the components included in the fire control system. The bullet tracking imager tracks the bullet passing the target plane (step 726). The processor (604, See FIG. 6) locates the bullet position at the TOF, i.e., at the time the bullet is passing the target plane (step 728). The processor then locates the aimpoint in the target image at the TOF (step 730). The processor (404, See FIG. 4) then determines the bullet offset between the bullet location and the aimpoint location, i.e., the correction to the aimpoint for a second shot (step 732). The digital crosshair is given an updated location based on the bullet offset (step 734). The shooter may then aim the gun and fire a second shot, and the process repeats with recording the gun fire (step 716). If the second shot does not impact the target, then this loop continues until the target is hit. If the second shot does impact the target, then the process repeats with determining the range (step 702) for a second, and subsequent, target.

Figure 8:
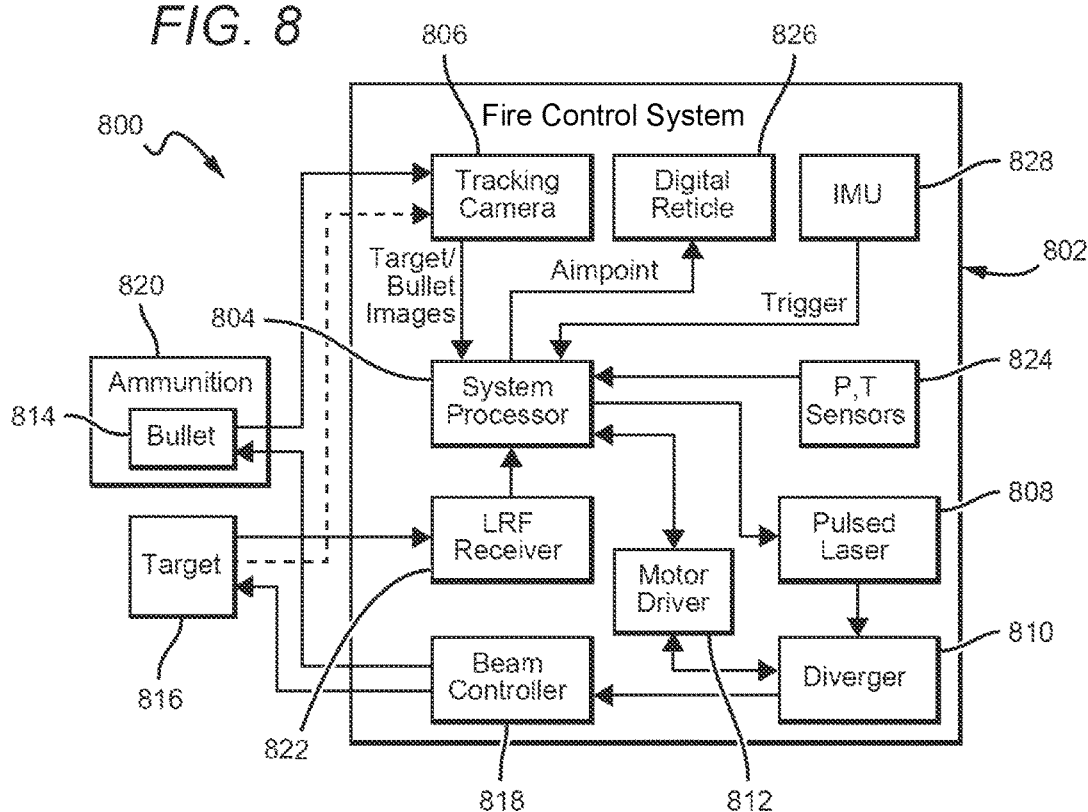
FIG. 8 depicts an exemplary system architecture of a third exemplary system having integrated target tracking and range finding.

FIG. 8 depicts an exemplary system architecture 800 of a third exemplary system having integrated target tracking and range finding. The third exemplary system may correspond to the second exemplary configuration for tracked bullet correction using a digital crosshair and a digital reticle as shown in FIGS. 3A-3D. This third exemplary embodiment utilizes imagers for bullet tracking and target tracking, sensors for pressure and temperature measurements, and an integrated laser rangefinder.

The primary components of the system may be embodied in a fire control system 802, a portion of which may be detachably attached or fixedly attached to a gun. In some embodiments, the fire control system 802 may be detached from a gun, but in communication with a reticle 826 attached to the gun. The system includes a processor having addressable memory 804. One or more imagers 806, such as a bullet tracking imager and a target tracking imager, may be in communication with the processor 804. A laser 808, such as a pulsed laser, may be in communication with the processor 804. A diverger 810 may be in communication with the processor 804 via a motor driver 812, which is used effect zoom and increase or decrease laser divergence during laser rangefinding and/or illuminating a retroreflector array on a base of a bullet 814 during the bullet trajectory towards a target 816. In some embodiments, laser divergence may be changed by moving a lens with respect to the laser 808, moving the laser 808 with respect to a lens, and/or inserting a slab of glass between the laser 808 and a lens. A beam controller 818 may be used to position the laser 808 to track the bullet trajectory of the bullet 814. Ammunition 820 used by the system may include one or more bullets 814 having a retroreflector array disposed on a base of the bullet 814.

Laser light from the laser 808 may be pulsed and reflected off of a target 816 and received by a laser rangefinder (LRF) receiver 822 in communication with the processor 804 to determine a distance from the gun to the target 816. Laser light from the laser 808 is also reflected by the retroreflector array disposed on the base of the bullet 814 and captured in a field of view (FOV) of the imager 806, e.g., a bullet tracking camera having a narrowband laser filter.

The local pressure and/or temperature may be measured by pressure and temperature sensors 824 in communication with the processor 804. The system processor 804 may calculate the elevation holdoff based on a knowledge of: a visually estimated or measured distance from the gun to the target, a measured pressure, a measured temperature, and a knowledge of the bullet ballistic coefficient and muzzle velocity. The system processor 804 may calculate the windage holdoff based on these ballistic factors, plus a knowledge of the crosswind value and relative target motion. The system processor 804 may then determine a time of flight (TOF) of the bullet 814 fired from the gun to pass a target plane (See FIG. 1B) of the target 816 based on the distance from the gun to the target, the measured pressure, and/or the measured temperature. This calculated TOF may correspond to a number of frames captured by the imager 806, e.g., the bullet tracking camera having a narrowband laser filter and a set frame rate.

The shooter uses a digital reticle 826, e.g., a digital crosshair with windage holdoff marks, in communication with the processor 804 to align the digital crosshair with the intended aimpoint on target 816. The digital reticle 826 may be shown on a display, e.g., a scope, presented to the shooter. In some embodiments, the digital reticle 826 may be replaced by an analog reticle mechanism. A disturbed reticle includes both analog and virtual crosshairs. At the time the bullet 814 is fired an inertial measurement unit (IMU) 828, in communication with the processor 804, detects the recoil of the gun. In some embodiments, a microphone in communication with the processor 804 may be used to determine the time when the bullet 814 is fired. The processor 804 determines the TOF for the bullet to pass the target plane from the moment the recoil is detected by the IMU 828. The laser 808, diverger 810, motor driver 812, and beam controller 818 work together to illuminate the retroreflector array disposed on a base of the bullet 814 during the bullet trajectory towards the target 816. At the TOF when the bullet 814 passes the target plane, the imager 806, e.g., the bullet tracking camera, captures the location of the light reflected by the retroreflector array of the bullet 814. The shooter does not need to position the digital crosshair on the target 816 at the TOF following recoil of the gun during firing as long as the target 816 is within the field of view (FOV) of the imager 806, e.g., the target tracking camera having a broadband spectral response. The shooter may select the aimpoint on the target 816 prior to firing and the processor 804 may track the location of the aimpoint thereafter. The processor 804 can then determine the location of the bullet 814 relative to the tracked location of the aimpoint at the time the bullet 814 passes the target plane at the calculated TOF. The processor 804 can then provide an updated location of the digital reticle 826 based on a difference between the location of the bullet 814 and the location of the aimpoint on the target 816 at the time the bullet 814 crosses the target plane at the TOF. The shooter can align this updated digital reticle 826 with the intended aimpoint on the target 816 and fire a second bullet 814 which will then impact the target or provide an updated location of the digital reticle 826 due to any wind changes and/or shooter errors. The time between the first shot and a second shot may be short, e.g., within ten seconds, to prevent errors caused by wind changes or acceleration in the relative target motion. Preferably, the second shot is fired within five seconds after the first shot.

Figure 9:
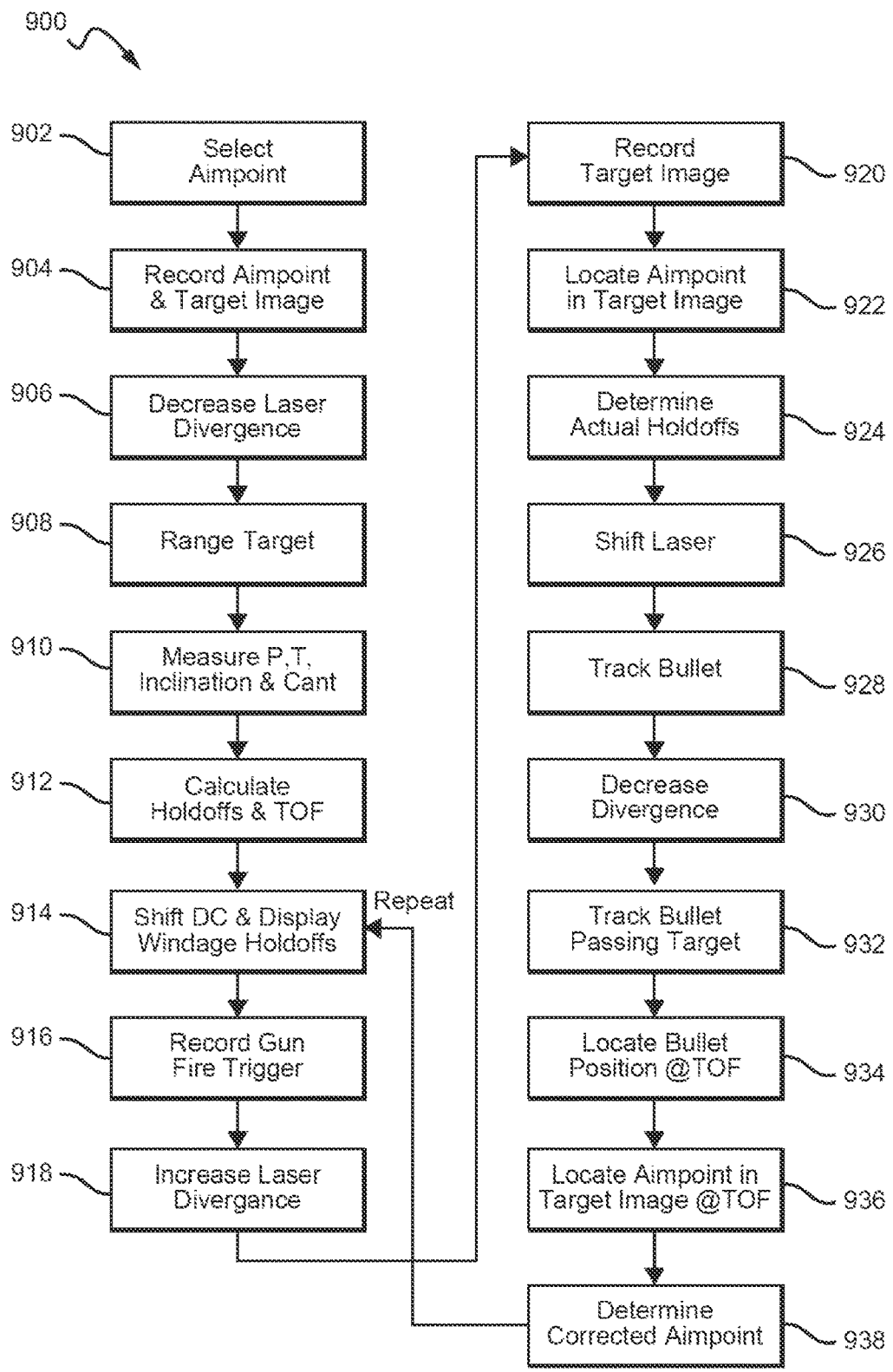
FIG. 9 depicts an exemplary functional block diagram of the third exemplary system depicted in FIG. 8.

FIG. 9 depicts an exemplary functional block diagram 900 of the third exemplary system depicted in FIG. 8. An aimpoint is selected (step 902), e.g., a shooter aims a gun at a target and presses a switch to record the intended aimpoint on the target. The aimpoint is recorded and the target is imaged (step 904) and contrast features are registered. The aimpoint is being tracked by the system from the moment the aimpoint is recorded. The system may take a coupon, e.g., a small number of pixels around the recorded aimpoint, and match that pattern on each frame received back from a target tracking imager in order to track the location of the target. The laser divergence is decreased (step 906). The laser beam is made narrower to increase energy for a rangefinding event. Decreasing the laser divergence makes the laser into a smaller spot to concentrate the energy on the target to get a stronger reflection back for the range measurement. The target is ranged (step 908), e.g., via a pulsed laser and laser rangefinder receiver. The pressure, temperature, inclination, and cant are measured (step 910). These measurements may be done by a pressure sensor, temperature sensor, and inertial measurement unit (IMU) in communication with the processor. These measurements will be used to compute a ballistics solution and determine where to place the digital reticle and digital crosshair.

The time of flight (TOF) is calculated based on the distance from the gun to the target, the measured pressure, the measured temperature, the measured gun inclination, and/or the measured gun cant (step 912). The digital crosshair is shifted and windage holdoffs are displayed to the shooter (step 914). The windage holdoffs include a grid of lines, because the system processor has no crosswind information. The distance between the lines and/or thickness of these lines may be adjusted based on shooter preference. At this point, the system is tracking the aimpoint and waiting for the gun to fire. The rifle cant may be measured again by the IMU (step 910). This information may be used to continuously update the elevation and windage adjustments and therefore the digital reticle position. The gun fire trigger is recorded using an IMU (step 916), which may include an accelerometer. The laser divergence is increased (step 918). The target image is recorded (step 920) at the time of gunfire. This image may be used to determine if a windage correction was made by the user, if there was an aiming error, and where the target was in relation to the digital reticle and digital crosshair (See FIG. 3B).

The aimpoint is located in the target image and contrast features are registered (step 922). Actual holdoffs are determined (step 924), e.g., aiming error and the shooter's windage holdoff. Optionally, the laser is shifted (step 926) and the bullet begins to be tracked early in the flight, before TOF. The bullet is tracked along the bullet trajectory (step 928). The laser divergence is decreased (step 930). The decrease in laser divergence is to tighten up the laser beam as bullet gets further away from the gun and closer to the target. The bullet is tracked passing the target (step 932). The range of the bullet during flight may be recorded by the rangefinder in step 928, allowing the system to accurately determine when the bullet crosses the target plane. The centroid algorithm may be used for tracking. The computer time is based on a frame count of the imager, where the firing of the gun is frame 0. The bullet position is located at the TOF (step 934), i.e., the bullet location when the bullet is passing the target plane. The aimpoint is located in the target image at the time of flight (step 936), i.e., the target location when the bullet passes the target plane. A corrected aimpoint is determined (step 938). The digital reticle and digital crosshair are updated to present a new location for the shooter for a second, more accurate, shot. The shooter may then fire a second shot and the process repeats with shifting the digital reticle and digital crosshair and displaying the windage holdoffs (step 914). If the second shot does not impact the target, then this loop continues until the target is hit. If the second shot does impact the target, then the process repeats with selecting an aimpoint (step 902) for a second, and subsequent, target.

The location of the updated digital crosshair and digital reticle may be dynamically updated based on the current inclination of the gun and/or the current cant of the gun. Accordingly, a shift in inclination and/or cant between a first shot and a second shot may result in a correction to the digital reticle and digital crosshair for the second shot to account for such a change. The system may account for ballistic and initial aiming errors including atmospheric conditions, target range, target inclination, rifle cant, spin drift/Coriolis, uprange wind, downrange wind, and/or muzzle velocity error.

Figure 10A:
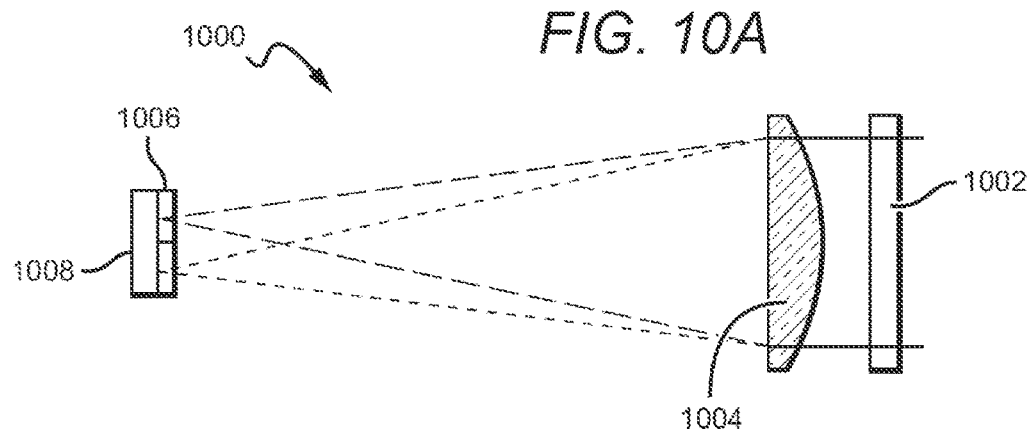
FIG. 10A depicts an exemplary embodiment of a tracking system having a single image sensor.
Figure 10B:
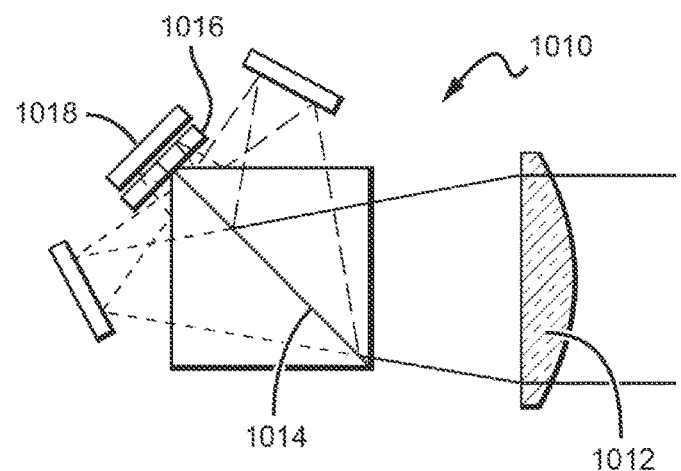
FIG. 10B depicts an exemplary embodiment of another tracking system having an image sensor and a dichroic beamsplitter.
Figure 10C:
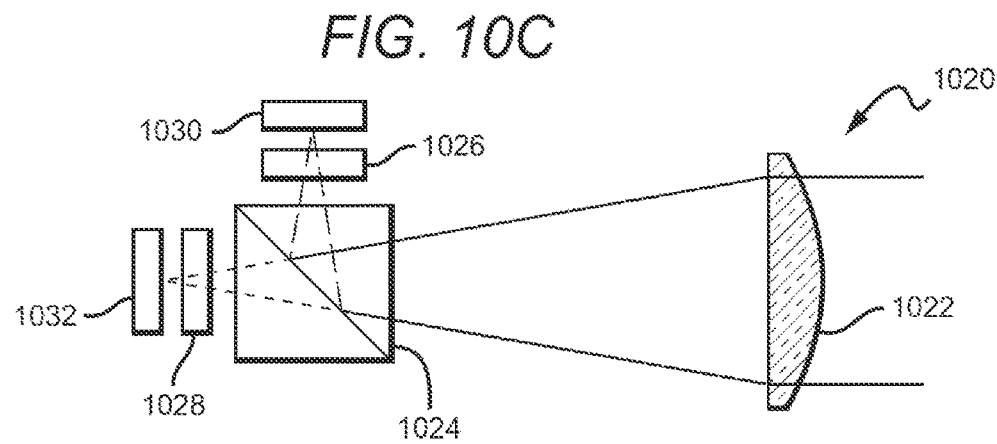
FIG. 10C depicts an exemplary embodiment of another tracking system having two image sensors and a dichroic beamsplitter.

FIGS. 10A-10C depict exemplary embodiments of imagers having one or more image sensors for tracking bullet locations and/or tracking target locations.

FIG. 10A depicts an exemplary embodiment of a tracking system 1000 having a single image sensor. The system 1000 includes a polarizing grating or diffractive optical elements (DOE) 1002, an objective lens 1004, one or more bandpass filters 1006, and a single focal-plane array (FPA) 1008. This system 1000 may use image processing algorithms tolerant to saturation in either target or bullet tracking images. The exposure time may vary on alternating frames, allowing different exposure times for target and bullet tracking images.

FIG. 10B depicts an exemplary embodiment of another tracking system 1010 having an image sensor and a dichroic beamsplitter. The system 1000 includes an objective lens 1012, a dichroic beamsplitter 1014, a bandpass filter 1016, and a FPA 1018. This system 1010 may use image processing algorithms tolerant to saturation in either target or bullet tracking images. The exposure time may vary on alternating frames, allowing different exposure times for target and bullet tracking images.

FIG. 10C depicts an exemplary embodiment of another tracking system having two image sensors and a dichroic beamsplitter. The system 1020 includes an objective lens 1022, a dichroic beamsplitter 1024, two or more bandpass filters 1024, 1028, and two or more FPAs 1030, 1032. This system 1010 may use a target tracking camera having a broadband spectral response for operation in low light, e.g., dawn and dusk, as needed; and a bullet tracking camera having a narrowband laser filter using less than 20 ms integration time to minimize bullet image blur at target, e.g., less than three pixels. In some embodiments, the tracking system may use two image sensors with separate objective lenses and/or filters for separate imaging of the bullet and a target.

Figure 11A:
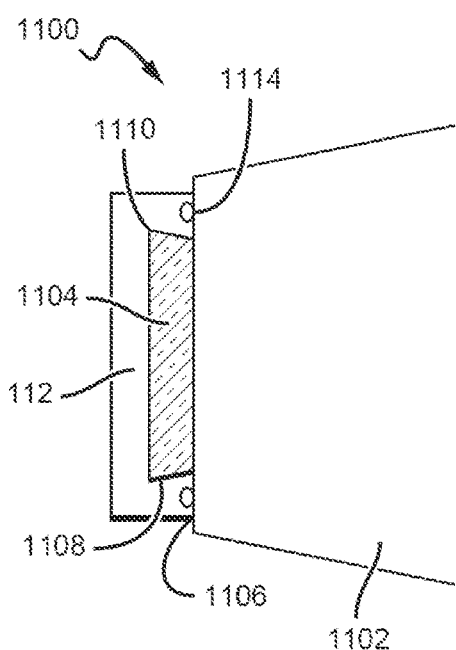
FIG. 11A depicts a side view of a cover and a retroreflector array disposed on an end of a bullet prior to use.
Figure 11B:
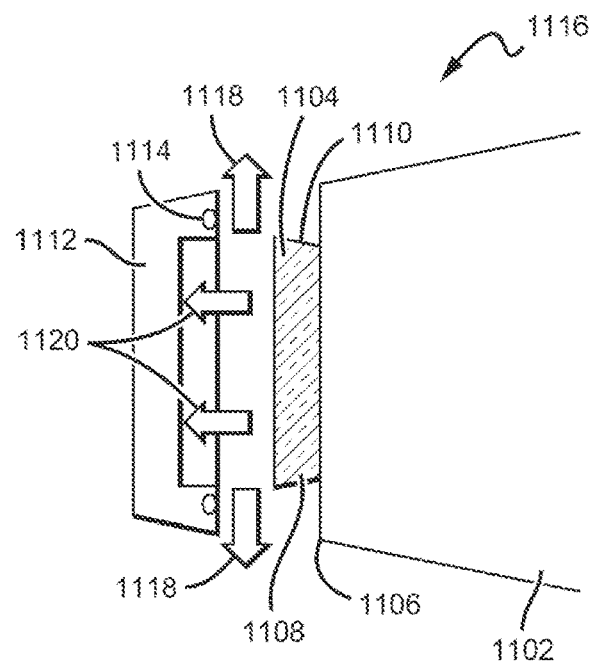
FIG. 11B depicts a side view of the cover and the retroreflector array of FIG. 11A at muzzle exit.

FIGS. 11A-11B depict a first embodiment of a retroreflector array having the retroreflector array disposed on top of a base of a bullet.

FIG. 11A depicts a side view of a cover and a retroreflector array disposed on an end of a bullet prior to use 1100. A bullet 1102 has a retroreflector array 1104 adhered to a base 1106 of the bullet 1102. The retroreflector array 1104 has prism facets with a periodicity between 0.2 mm-2.0 mm.

In some embodiments, the prism facets of the retroreflector array 1104 may have a periodicity between 0.3 mm-1.0 mm. The retroreflector array 1104 may have flared edges 1108, 1110. A cover 1112 is disposed over the retroreflector array 1104 and sealed at the base 1106 of the bullet 1102. The cover 1112 is disposed over the retroreflector array in a first position prior to firing. The cover 1112 may be clamped onto a perimeter of the retroreflector array 1104. The flared edges 1108, 1110 of the retroreflector array 1104 may prevent the cover 1112 from falling off prior to firing the bullet 1102, e.g., during assembly, handling, etc. An o-ring 1114 may be disposed between the cover 1112 and the base 1106 of the bullet 1102. The o-ring 1114 hermetically seals the retroreflector array 1104 at the base 1106 of the bullet 1102. In some embodiments, the o-ring 1114 may be replaced with, and/or supplemented by, a pressure sensitive adhesive. The pressure sensitive adhesive may hermetically seal the retroreflector array 1104 at the base 1106 of the bullet 1102, protecting the retroreflector array 1104 from damage due to exposure to high pressure propellant combustion gasses during firing of the bullet 1102.

FIG. 11B depicts a side view of the cover and the retroreflector array of FIG. 11A when the bullet exits the muzzle 1116. The cover 1112 is released from the base 1106 of the bullet 1102 in a second position after firing. The cover 1112, o-ring 1114, and/or pressure sensitive adhesive prevents any propellant combustion gasses from scorching, or otherwise damaging, the retroreflective array 1104 during firing of the bullet 1102. The cover is deformed 1118 and released 1120 from the base 1106 of the bullet 1102 due to deformation from centrifugal force. The high spin rate of the bullet 1102 causes the cover to deform 1118 away from the flanges 1108, 1110 of the retroreflector array 1104 that were keeping the cover 1112 snapped on. The deformed cover 1112 can then be released 1120 and fall away from the bullet 1102 shortly after firing and muzzle exit from a gun.

Figure 12A:
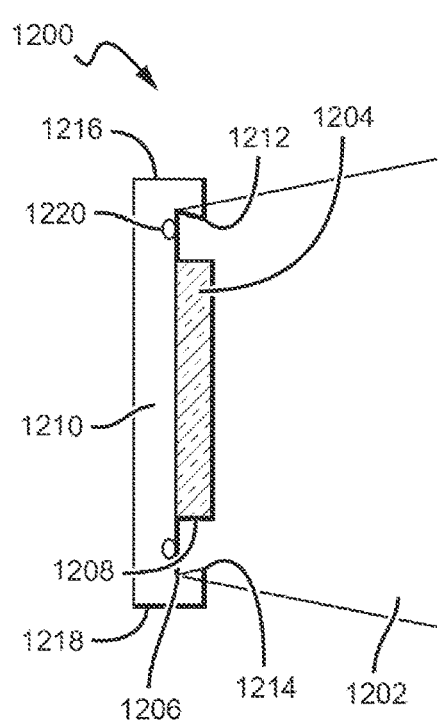
FIG. 12A depicts a side view of a cover and a retroreflector array disposed in an end of a bullet prior to use.
Figure 12B:
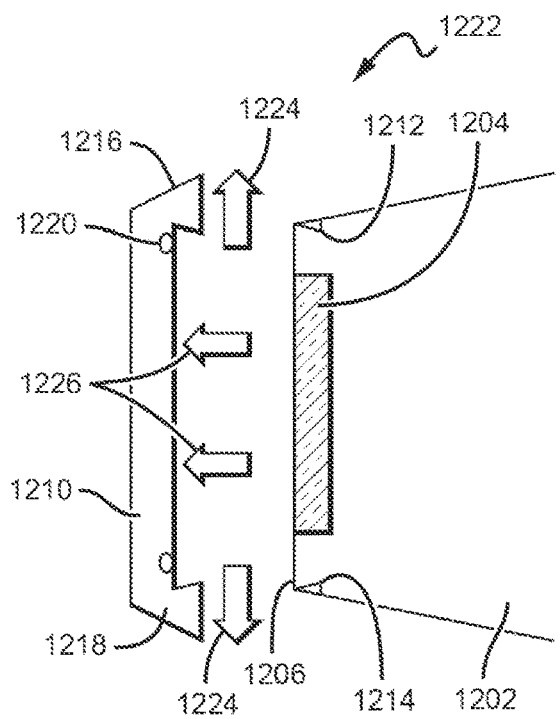
FIG. 12B depicts a side view of the cover and the retroreflector array of FIG. 12A at muzzle exit.

FIGS. 12A-12B depict a second embodiment of a retroreflector array having the retroreflector array disposed in an indentation in a base of a bullet.

FIG. 12A depicts a side view of a cover and a retroreflector array disposed in a base of a bullet prior to use 1200. A bullet 1202 has a retroreflector array 1204 adhered to a base 1206 of the bullet 1202. The retroreflector array 1204 has prism facets with a periodicity between 0.2 mm-10.0 mm. The retroreflector array 1204 may be disposed in an indentation 1208 in the base 1206 of the bullet 1202. A cover 1210 is disposed over the retroreflector array 1204 and hermetically sealed at the base 1206 of the bullet 1202. The cover 1210 is disposed over the retroreflector array in a first position prior to firing. The cover 1210 may be clamped onto the base 1206 of the bullet 1202. The base 1206 of the bullet 1202 may include three or more equidistant dimples 1212, 1214 cut into the base 1206 of the bullet 1202. The cover 1210 may include three or more equidistant fingers 1216, 1218 that mate into each of the three or more equidistant dimples 1212, 1214. These fingers 1216, 1218 and dimples 1212, 1214 may prevent the cover 1210 from falling off prior to firing the bullet 1202, e.g., during assembly, handling, etc. An o-ring 1220 may be disposed between the cover 1210 and the base 1206 of the bullet 1202. The o-ring 1220 seals the retroreflector array 1204 at the base 1206 of the bullet 1202. In some embodiments, the o-ring 1220 may be replaced with, and/or supplemented by, a pressure sensitive adhesive. The pressure sensitive adhesive may seal the retroreflector array 1204 at the base 1206 of the bullet 1202 to protect the retroreflector array 1104 from damage due to exposure to high pressure propellant combustion gasses.

FIG. 12B depicts a side view of the cover and the retroreflector array of FIG. 12A at muzzle exit 1222. The cover 1210 is released from the base 1206 of the bullet 1202 in a second position after firing. The cover 1210, o-ring 1220, and/or pressure sensitive adhesive prevents any gasses from scorching, or otherwise damaging, the retroreflective array 1204 during firing of the bullet 1202. The cover is deformed 1224 and released 1226 from the base 1206 of the bullet 1202 due to deformation from centrifugal force. The high spin rate of the bullet 1202 causes the fingers 1216, 1218 of the cover 1210 to deform 1224 away from the dimples 1212, 1214 in the base 1206 of the bullet 1202 that were keeping the cover 1210 snapped on. The fingers 1216, 1218 of the cover 1210 may also separate from the dimples 1212, 1214 in the base 1206 of the bullet 1202 due to wind resistance. The deformed cover 1210 can then be released 1226 and fall away from the bullet 1202 shortly after firing and muzzle exit from a gun.

Figure 13:
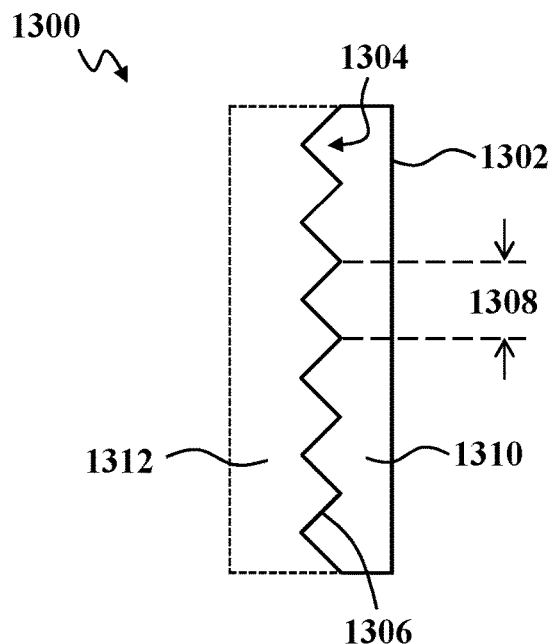
FIG. 13 depicts an exemplary retroreflector array.

FIG. 13 depicts an exemplary retroreflector array 1300. The retroreflector array 1300 includes an optical surface 1302 being optically smooth and optically flat allowing light to pass through. The retroreflector array includes a plurality of corner cube prism facets 1304 having a reflective coating 1306 disposed on a top surface, e.g., an aluminum coating. The periodicity 1308 of each prism in the retroreflector array 1300 may be between about 0.2 mm to 10.0 mm. An optical polymer 1310 may fill the space between the optical surface 1302 and the plurality of prism facets 1304. A polymer 1312 encapsulates a back surface of the plurality of prisms facets 1304. The optical polymer 1310 and polymer 1312 fill in the space of the retroreflector array 1300 so that the retroreflector array 1300 does not contain any air and survives forces present during firing of a gun.

Figure 14A:
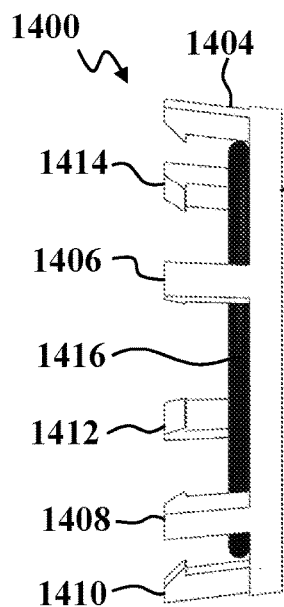
FIG. 14A depicts a side view of an exemplary cover for the retroreflector array of FIG. 13.
Figure 14B:
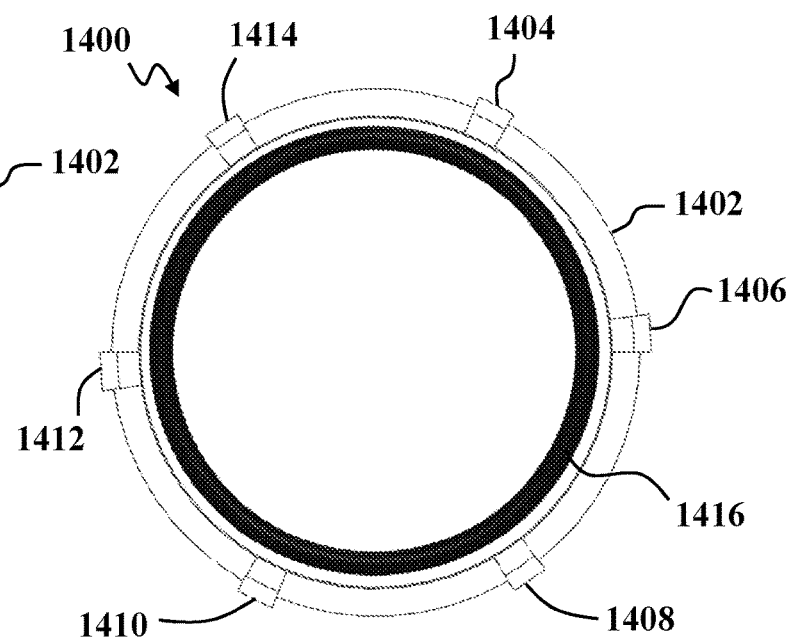
FIG. 14B depicts a front view of the exemplary cover of FIG. 14A.

FIG. 14A depicts a side view of an exemplary cover 1400 for the retroreflector array of FIG. 13. FIG. 14B depicts a front view of the exemplary cover 1400 of FIG. 14A The cover 1400 may include a base member 1402 and a plurality of fingers 1404, 1406, 1408, 1410, 1412, 1414 to attach the cover 1400 to a base of a bullet. The base member 1402 may include an o-ring 1416 to create a hermetical seal at the base of the bullet. The fingers 1404, 1406, 1408, 1410, 1412, 1414 may deform and detach from the base of the bullet after muzzle exit via deformation from centrifugal force, softening of the materials of the cover from heating, and/or wind resistance. The fingers 1404, 1406, 1408, 1410, 1412, 1414 may be equidistant about the perimeter of the base member 1402, and the number of fingers may vary based on the desired application (e.g., three fingers to twenty-seven fingers). The o-ring 1416 seal is broken after muzzle exit, protecting a retroreflector array during firing. The o-ring 1416 may be made from a high temperature rubber-type material, e.g., Viton® made by DuPont Performance Elastomers, LLC of Wilmington, Del. In some embodiments, the o-ring 1416 may be replaced, or supplemented, by a pressure-sensitive adhesive. In some embodiments, the cover 1400 may have a thickness between about 0.010 in. to 0.050 in.

Figure 15:
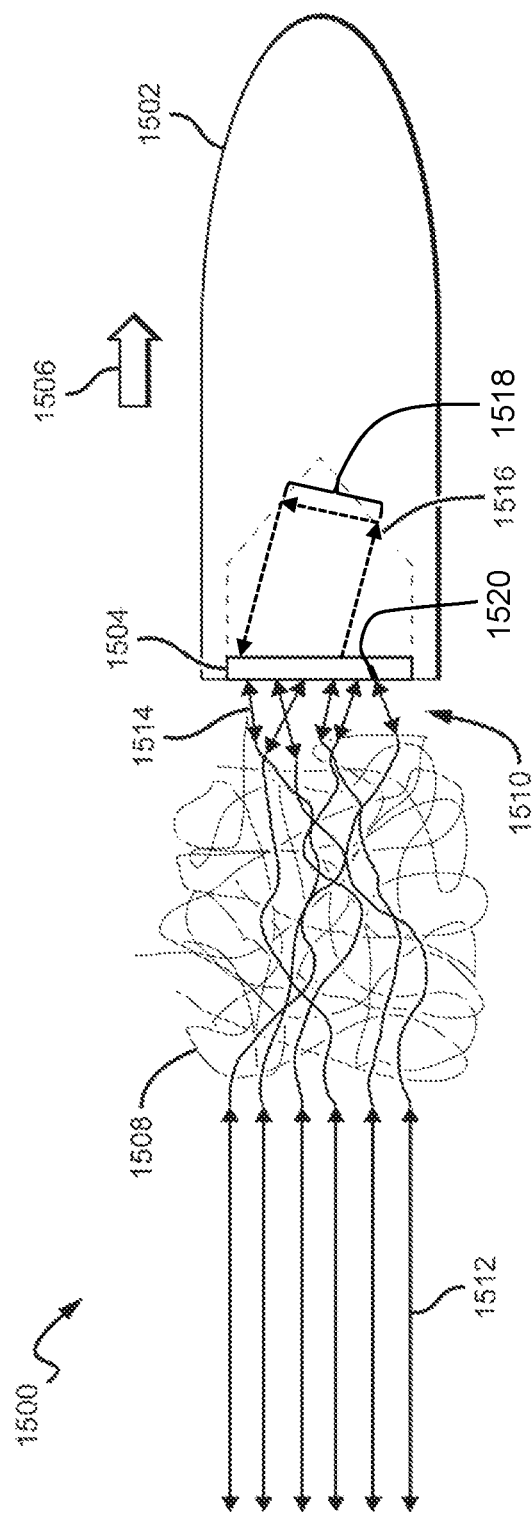
FIG. 15 depicts pseudo-phase conjugation occurring in a bullet having a retroreflector array.

FIG. 15 depicts pseudo-phase-conjugation occurring in a bullet having a retroreflector array 1500. A bullet 1502 having a retroreflector array 1504 disposed in a base of the bullet 1502 is traveling in a first direction 1506. As the bullet 1502 travels in a first direction, air is displaced and this creates an area of turbulent mixing 1508 in the bullet trail 1510. $R_0$ in the propagation of light is the size of the area through which light propagates that can be considered to have a constant phase, i.e., the area in which there is no change in the index of refraction. $R_0$ in the bullet trail 1510 is about 1 mm or less (e.g., about 0.5 mm). Collimated light rays 1512 from a laser light enter the area of turbulent mixing, experience phase aberration, and enter the retroreflector array as non-collimated rays 1514.

A traditional retroreflector 1516, shown in dashed lines, may be significantly larger than the retroreflector array 1504 disclosed herein. The traditional retroreflector 1516 reduces mass in the tail end of a bullet, which changes the ballistics of the bullet and increases dispersion. Additionally, any light incident on the traditional retroreflector 1516 enters as non-collimated rays, which causes the reflected light to have greater dispersion. Accordingly, light viewed from a tracking camera FOV (See FIGS. 2A-3D) will have greater dispersion and any tracking of the bullet and/or correction for subsequent shots will be less accurate due to inaccuracies of precision in determining the bullet location. In a larger, single retroreflector 1516, shown in dashed lines, there is a large displacement 1518 between the incident and reflected rays, shown in dashed lines, that is greater than $R_0$. The incident and reflected rays experience different phase aberrations because the travel through air having different $R_0$ values. The reflecting rays are therefore less likely to be parallel to the incident rays, decreasing the signal at the bullet tracking camera.

The retroreflector array 1504 disposed in the base of the bullet 1502 does not substantially affect the travel of the bullet by reducing mass in the end of the bullet, and/or changing the weight distribution of the bullet. Accordingly, the bullet 1502 with the retroreflector array 1504 will have a more predictable and/or consistent flight path (i.e., less dispersion) than a bullet having a traditional retroreflector.

The non-collimated rays 1514 enter and exit the retroreflector array 1504 along nearly the same path, travel back through the area of turbulent mixing 1508 along nearly the same path, and travel back to an observer, e.g., a tracking camera FOV (See FIGS. 2A-3D), as collimated light rays 1512. This is due to pseudo-phase conjugation occurring as a result of the incident and reflected rays being separate by a distance 1520 that is less than $R_0$. There is an unexpected benefit of having a retroreflector array 1504 having a prism periodicity between 0.2 mm-1.0 mm to exploit this pseudo-phase conjugation. There is a correlation between the $R_0$ of about 0.5 mm and the prism periodicity of between 0.2 mm-1.0 mm.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
   determining, by a processor having addressable memory, a time of flight (TOF) of a first bullet fired from a gun to pass a target plane of a target, wherein the TOF is based on at least one of: a distance from the gun to the target, a measured pressure, and a measured temperature;
   determining, by the processor, a location of an aimpoint on the target in an imager field of view (FOV) relative to a disturbed reticle at a time the first bullet is fired by the gun;

determining, by the processor, a location of the first bullet relative to the location of the aim point on the target at the TOF in the imager FOV; and determining, by the processor, an updated location of the disturbed reticle based on a difference between the location of the first bullet and the location of the aimpoint on the target at the time the first bullet crosses the target plane and a difference between the location of the disturbed reticle and the location of the aimpoint on the target at the time the first bullet was fired, wherein determining the distance from the gun to the target comprises:
measuring the distance using a laser;
decreasing a laser divergence;
pulsing the laser; and
receiving the pulsed laser reflected off the target at a laser rangefinder (LRF) receiver.

2. The method of claim 1 further comprising:
selecting, by the processor, the aim point on the target in the imager FOV; and
tracking, by the processor, the location of the aimpoint on the target in the imager FOV.

3. The method of claim 1 further comprising:
displaying the disturbed reticle via a display.

4. The method of claim 3 further comprising:
displaying the windage holdoffs via a display.

5. The method of claim 1 wherein determining the location of the first bullet at the TOF further comprises:
increasing a laser divergence; and
shifting the laser to track the first bullet in a first bullet trajectory.

6. The method of claim 5 wherein determining the location of the first bullet at the TOF further comprises:
decreasing the laser divergence; and
tracking the first bullet at the TOF via laser light reflected by a retroreflector array disposed on an end of the first bullet and captured in the imager FOV.

7. The method of claim 1 further comprising:
determining, by the processor, when the first bullet is fired via a detected recoil of the gun by at least one of: a shock sensor, an accelerometer, a microphone, and an inertial measurement unit (IMU).

8. The method of claim 1 further comprising:
determining, by the processor, a location of the aim point on the target in the imager field of view (FOV) relative to the disturbed reticle at a time a second bullet is fired by the gun; and
determining, by the processor, a location of the second bullet relative to the location of the aim point on the target at the TOF in the imager FOV.

9. The method of claim 8 further comprising, if the second bullet does not impact the target:
determining, by the processor, an updated location of the disturbed reticle based on a difference between the location of the second bullet and the location of the aim point on the target at the time the second bullet crosses the target plane and a difference between the location of the disturbed reticle and the location of the aim point on the target at the time the second bullet was fired.

10. The method of claim 8 further comprising, if the second bullet impacts the target:
determining, by the processor, a second time of flight (TOF) of a third bullet fired from a gun to pass a second target plane of a second target, wherein the second TOF is based on at least one of: a distance from the gun to the second target, a measured pressure, and a measured temperature;

determining, by the processor, a location of an aimpoint on the second target in the imager FOV relative to the disturbed reticle at a time the third bullet is fired by the gun;

determining, by the processor, a location of the third bullet relative to the location of the aim point on the second target at the second TOF in the imager FOV;

determining, by the processor, an updated location of the disturbed reticle based on a difference between the location of the third bullet and the location of the aimpoint on the second target at the time the third bullet crosses the target plane and a difference between the location of the disturbed reticle and the location of the aim point on the second target at the time the third bullet was fired.

11. A system comprising:
a processor having addressable memory, the processor configured to:
determine a time of flight (TOF) of a first bullet fired from a gun to pass a target plane of a target, wherein the TOF is based on at least one of: a distance from the gun to the target, a measured pressure, and a measured temperature;
determine a location of an aim point on the target in an imager field of view (FOV) relative to a disturbed reticle at a time the first bullet is fired by the gun;
determine a location of the first bullet relative to the location of the aim point on the target at the TOF in the imager FOV; and
determine an updated location of the disturbed reticle based on a difference between the location of the first bullet and the location of the aimpoint on the target at the time the first bullet crosses the target plane and a difference between the location of the disturbed reticle and the location of the aim point on the target at the time the first bullet was fired,
wherein the processor is further configured to:
measure the distance from the gun to the target using a laser;
decrease a laser divergence;
pulse the laser; and
receive the pulsed laser reflected off the target at a laser rangefinder (LRF) receiver.

12. The system of claim 11 further comprising:
a bullet tracking imager in communication with the processor, wherein the bullet tracking imager comprises a narrowband laser filter.

13. The system of claim 11 further comprising:
a target tracking imager in communication with the processor, wherein the target tracking imager comprises a broadband spectral response.

14. The system of claim 11 further comprising:
a display in communication with the processor, wherein the processor is further configured to:
display the disturbed reticle and windage holdoffs prior to firing the first bullet; and
display the updated disturbed reticle and windage holdoffs after firing the first bullet.

15. The system of claim 11 further comprising:
a sensor comprising at least one of: a shock sensor, an accelerometer, a microphone, and an inertial measurement unit (IMU) in communication with the processor, wherein the processor is further configured to:
determine when the first bullet is fired via a signal from the sensor.

16. The system of claim 11 further comprising:
an inertial measurement unit (IMU) in communication with the processor, wherein the processor is further configured to:
determine when the first bullet is fired via a detected recoil;
determine an inclination of the gun; and
determine a cant of the gun;
wherein the updated location of the disturbed reticle is dynamically updated based on at least one of: a difference between the determined inclination of the gun at the time the gun was fired and the determined current inclination of the gun, and a difference between the determined cant of the gun at the time the gun was fired and the determined current cant of the gun.

17. The system of claim 11 further comprising:
a pressure sensor configured to transmit the measured pressure to the processor;
a temperature sensor configured to transmit the measured temperature to the processor; and
a laser rangefinder configured to transmit the distance from the gun to the target to the processor.

18. A device comprising:
a processor having addressable memory, the processor configured to:
determine a time of flight (TOF) of a first bullet fired from a gun to pass a target plane of a target, wherein the TOF is based on at least one of: a distance from the gun to the target, a measured pressure, and a measured temperature;
determine a location of an aim point on the target in an imager field of view (FOV) relative to a disturbed reticle at a time the first bullet is fired by the gun;
determine a location of the first bullet relative to the location of the aim point on the target at the TOF in the imager FOV; and
determine an updated location of the disturbed reticle based on a difference between the location of the first bullet and the location of the aimpoint on the target at the time the first bullet crosses the target plane and a difference between the location of the disturbed reticle and the location of the aim point on the target at the time the first bullet was fired,
wherein the processor is further configured to:
measure the distance from the gun to the target using a laser;
decrease a laser divergence;
pulse the laser; and
receive the pulsed laser reflected off the target at a laser rangefinder (LRF) receiver.

19. The device of claim 18 further comprising:
an inertial measurement unit (IMU) in communication with the processor, wherein the processor is further configured to:
determine when the first bullet is fired via a detected recoil;
determine an inclination of the gun; and
determine a cant of the gun;
wherein the updated location of the disturbed reticle is dynamically updated based on at least one of: a difference between the determined inclination of the gun at the time the gun was fired and the determined current inclination of the gun, and a difference between the determined cant of the gun at the time the gun was fired and the determined current cant of the gun.

* * * * *